United States Patent
Myodo et al.

(10) Patent No.: US 7,693,346 B2
(45) Date of Patent: Apr. 6, 2010

(54) TALLY IMAGE GENERATING METHOD, DECODING METHOD, TALLY IMAGE GENERATOR, AND DECODER

(75) Inventors: Emi Myodo, Fujimino (JP); Shigeyuki Sakazawa, Fujimino (JP); Yasuhiro Takishima, Fujimino (JP)

(73) Assignee: KDDI Corporation, Tokyo (JP)

( * ) Notice: Subject to any disclaimer, the term of this patent is extended or adjusted under 35 U.S.C. 154(b) by 1042 days.

(21) Appl. No.: 11/364,004

(22) Filed: Mar. 1, 2006

(65) Prior Publication Data
US 2006/0197990 A1 Sep. 7, 2006

(30) Foreign Application Priority Data
Mar. 2, 2005 (JP) .............................. 2005-057387

(51) Int. Cl.
G06K 9/36 (2006.01)
H04N 1/405 (2006.01)
(52) U.S. Cl. ...................... 382/276; 358/3.06
(58) Field of Classification Search .............. 382/100, 382/116–119, 237, 276, 284, 312; 358/2.99, 358/3.01, 3.06, 3.1, 3.26, 3.3, 534–536; 380/200; 375/240.26; 235/462.01
See application file for complete search history.

(56) References Cited

U.S. PATENT DOCUMENTS 5,971,276 A * 10/1999 Sano et al. ............. 235/462.01
7,016,420 B1 * 3/2006 Kagechi et al. ........ 375/240.26

FOREIGN PATENT DOCUMENTS

| JP | 09-252397 A | 9/1997 |
| JP | 2002-358013 A | 12/2002 |
| JP | 2003-198526 A | 7/2003 |

OTHER PUBLICATIONS

Ming Sun Fu et al., "Data Hiding in Halftone Images by Stochastic Error Diffusion", Proc. of IEEE Int. Conf. on Acoustics, Speech, and Signal Processing, vol. 3, pp. 1965-1968, 2001.
Emi Myodo et al., "A Watermark Sharing Scheme to High Quality Halftone Images with Genetic Algorithms", EvoWorkshops 2004, LNCS, 3005, pp. 339-348, 2004.
Kazuhiro Oka et al., "Embedding of Signed Information in Hardcopy Images by Systematic Dither Method", IEICE Trans. Fundamentals, vol. J80-D-II, No. 3, pp. 820-823, 1997.
Robert Ulichney, "The void-and-cluster method for dither array generation", Proc. SPIE., vol. 1913, pp. 332-343, 1993.
Moni Naor et al., "Visual Cryptography", Proc. Eurocrypt 1994, LNCS 950, 1995, pp. 1-12, 1995.
Zhi Zhou et al., "Halftone Visual Cryptography", proc. IEEE Int. Conf. on Image Processing, vol. 1, 2003, pp. 521-524, 2003.
Ming Sun Fu et al., "A Set of Mutually Watermarked Halftone Images", IEEE Int. Conf. on Image Processing 2003, vol. 2, pp. 467-470, 2003.

* cited by examiner

*Primary Examiner*—Kanji Patel
(74) *Attorney, Agent, or Firm*—Westerman, Hattori, Daniels & Adrian, LLP

(57) ABSTRACT

First, a set of seed images that tally with each other are prepared (S101). Next, a set of threshold matrices are created from the set of seed images (S102). Next, a plurality of tally images are created from an input gray-scale image by using the set of threshold matrices (S103). The tally images are combined, whereby the confidential image is decoded.

17 Claims, 16 Drawing Sheets

Fig. 1
(A) MATRIX 1
| 8 | 0 | 10 | 2 |
|---|---|----|---|
| 4 | 12 | 6 | 14 |
| 11 | 3 | 9 | 1 |
| 7 | 15 | 5 | 13 |
(B) MATRIX 2
| 0 | 8 | 2 | 10 |
|---|---|---|----|
| 12 | 4 | 14 | 6 |
| 3 | 11 | 1 | 9 |
| 15 | 7 | 13 | 5 |
* THESE MATRICES WILL BE NORMALIZED ACCORDING TO DYNAMIC RANGE OF INPUT GRAY-SCALE IMAGE
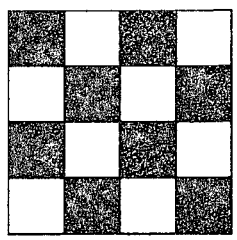
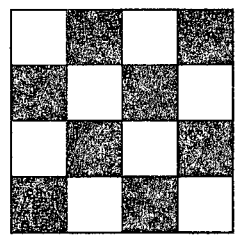
(C) TYPICAL PATTERN GENERATED FROM MATRIX 1
(D) TYPICAL PATTERN GENERATED FROM MATRIX 2
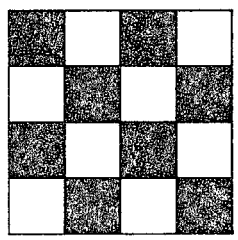
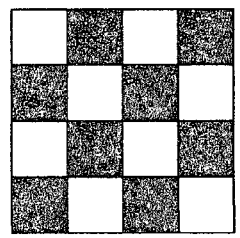
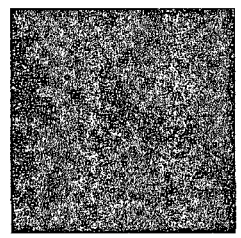
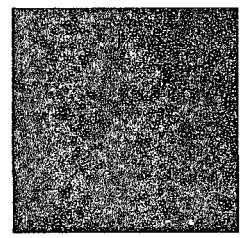
(C) + (C)     (D) + (D)    (C) + (D)    (D) + (C)
PRIOR ART

EXAMPLE OF
RANDOM IMAGE
(64 × 64 PIXELS)

EXAMPLE OF
BINARY PATTERN IMAGE
(64 × 64 PIXELS)

EXAMPLE OF THRESHOLD MATRIX
BEFORE NORMALIZATION

EXAMPLE OF THRESHOLD MATRIX
AFTER NORMALIZATION

MATRIX
NORMALIZED
IN RANGE
FROM 0 TO 255

CONFIDENTIAL IMAGE 1    CONFIDENTIAL IMAGE 2    REGION DIVIDING

CONFIDENTIAL IMAGE    SEED IMAGE 1    SEED IMAGE 2    SUPERPOSED IMAGE OF SEED IMAGES 1 AND 2

Fig. 22
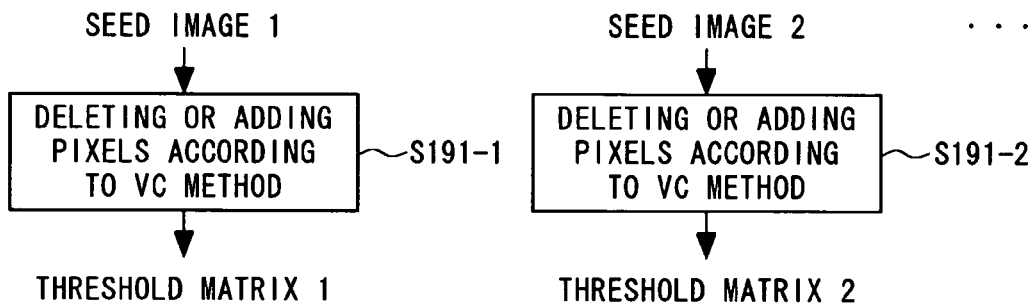
Fig. 23
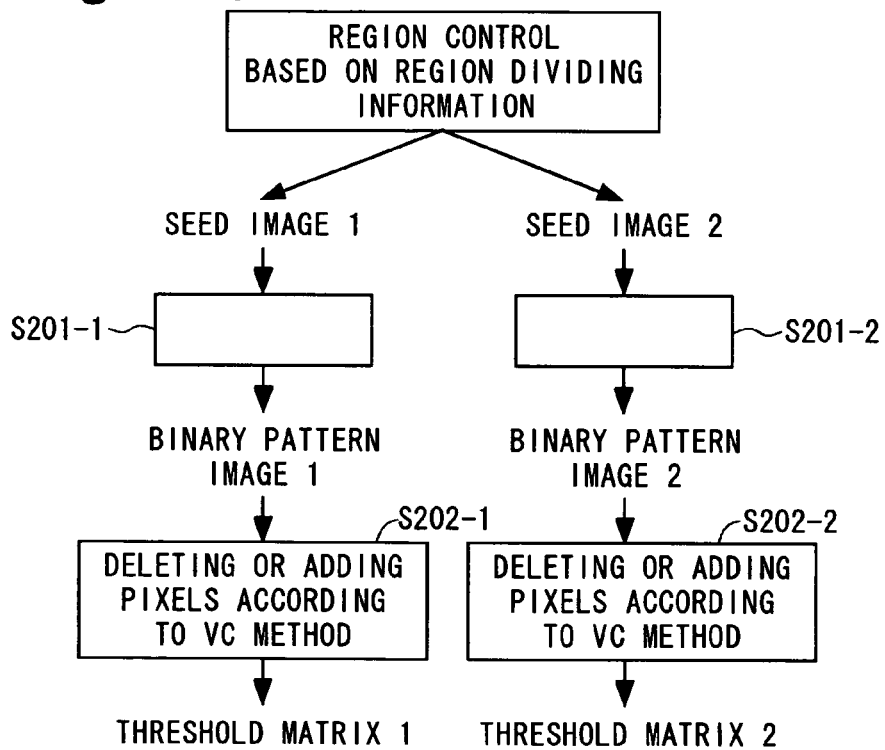
Fig. 24
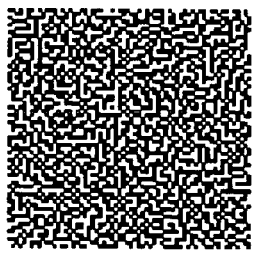
BINARY PATTERN
IMAGE 1
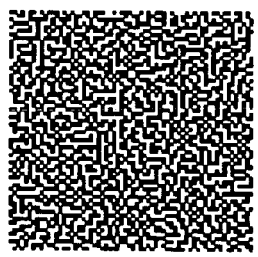
BINARY PATTERN
IMAGE 2
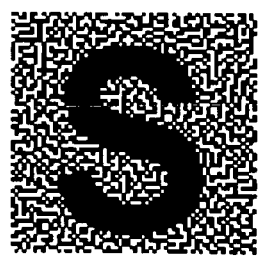
SUPERPOSED
IMAGE OF
BINARY PATTERN
IMAGES 1 AND 2

Fig. 31
  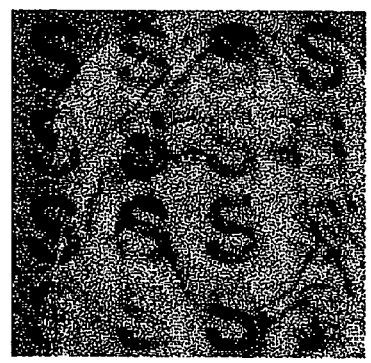
TALLY IMAGE 1
(256 × 256 PIXELS)
TALLY IMAGE 2
(256 × 256 PIXELS)
SUPERPOSED
IMAGE OF TALLY
IMAGES 1 AND 2
(256 × 256 PIXELS)
Fig. 32
  
TALLY IMAGE 1
(256 × 256 PIXELS)
TALLY IMAGE 2
(256 × 256 PIXELS)
SUPERPOSED
IMAGE OF TALLY
IMAGES 1 AND 2
(256 × 256 PIXELS)

TALLY IMAGE GENERATING METHOD, DECODING METHOD, TALLY IMAGE GENERATOR, AND DECODER

BACKGROUND OF THE INVENTION

1. Field of the Invention

The present invention relates to a tally image generating method, a decoding method, a tally image generator, and a decoder, and in particular, to a tally image generating method, a decoding method, a tally image generator, and a decoder which can generate high-quality tally images and decode a confidential image with a high resolution.

2. Description of the Related Art

Conventionally, tally image generating methods using the halftone technique have been proposed. "Tally" means that, although one or a partial tally does not show confidential information, the confidential information is known by superposing a plurality of tallies.

In Non-Patent Document 1, a tally image generating method using an error diffusion method is described. According to this method, errors are diffused to high-frequency components by a weighting filter, so that tally images with high quality can be generated.

In Non-Patent Document 2, a tally image generating method using a genetic algorithm (GA) is described. In this method, tallies are generated so that density values calculated by applying a Gaussian filter to a generated binary image become close to input pixel values of a gray-scale image, so that high-quality tally images can be generated.

In Non-Patent Document 3, a tally image generating method using a systematic ordered dither method is described. This is a method for generating tally images with a size equal to the size of an input gray-scale natural image in the same manner as in Non-Patent Document 1 and Non-Patent Document 2, and two threshold matrices like Bayer's matrix (the matrix size is normally 4×4) are used by being randomly switched for each pixel of a confidential image, and values of a threshold matrix are compared with the each pixel of the input gray-scale image, whereby tally images are generated at a high speed.

FIG. 1 shows an example of matrix switching in a tally image generating method using a systematic ordered dither method.

In Patent document 1, a tally image generating method using a density pattern method is described. This is a method for expressing a pixel value of an input gray-scale image by densities of d×d binary pixels (d is normally 2 through 4) of a tally image. The amount of calculation is small.

By using tally images generated by the tally image generating methods as described above, confidential information can be visually decoded without using a calculator. For example, tally images are printed on transparent sheets, and the transparent sheets are overlapped each other, whereby confidential information can be decoded.

[Patent Document 1] Japanese Patent Laid-open H09-252397

[Patent document 2] Japanese Patent Laid-open 2003-198526

[Patent document 3] Japanese Patent Laid-open 2002-358013

[Non-Patent Document 1] M. S. Fu, O. C. Au, "Data Hiding in Halftone Images using Stochastic Error Diffusion," Proc. of IEEE Int. Conf. on Acoustics, Speech, and Signal Processing, Vol. 3, pp. 1965-1968, 2001

[Non-Patent Document 2] Emi Myodo and Kiyoshi Tanaka, "A Watermark Sharing Scheme to High Quality Halftone Images with Genetic Algorithms," Applications of Evolutionary Computing: EvoWorkshops 2004, LNCS, Springer, Vol. 3005, pp. 339-348, 2004.

[Non-Patent Document 3] Kazuhiro Oka and Kineo Matsui, "Embedding of Signed Information in Hardcopy Images by Systematic Dither Method," IEICE Trans. Fundamentals, Vol. J80-D-II, No. 3, pp. 820-823, 1997.

[Non-Patent Document 4] R. Ulichney "The void-and-cluster method for dither array generation," Proc. SPIE. Vol. 1913, pp. 332-343, 1993.

[Non-Patent Document 5] M. Noar, A. Shamir, "Visual Cryptography," Proc. Eurocrypt '94, pp. 1-12, 1994

[Non-Patent Document 6] Z. Zhou, G. R. Arce, G. D. Crescenzo, "Halftone Visual Cryptography", Proc. IEEE Int. Conf. on Image Processing, 2003, Vol. 1, pp. 521-524, 2003.

[Non-Patent Document 7] M. S. Fu, O. C. Au, "A Set of Mutually Watermarked Halftone Images", IEEE Int. Conf. on Image Processing 2003, Vol. 2, pp. 467-470, 2003.

However, in the tally image generating method using the error diffusion method of the Non-Patent Document 1, a weighting filter is applied to each pixel and errors are weighted and summed up, so that the amount of calculation is large and high-speed generation of tally images is not possible.

Also, in the tally image generating method using the GA method of Non-Patent Document 2, tally images are generated so that density values calculated by applying a Gaussian filter to a binary image come close to input gray-scale pixel values, so that the amount of calculation is large, and high-speed generation of tally images is not possible.

In the tally image generating method using the systematic ordered dither of the Non-Patent Document 3, visually unfavorable regular patterns unique to matrices appear in tally images. In addition, image deterioration is caused due to random matrix switching, and the resolution of a confidential image lowers as the matrix size increases.

In the tally image generating method using the density pattern method of the Patent Document 1, the tally images become d×d times as large as the input image size, and pixels in a cell are randomly determined, whereby the image quality is low.

As described above, the conventional tally image generating methods have problems in that the methods that realize high quality of tallies are long in tally generating time, and the methods that shorten the tally generating time are inferior in image quality and cannot realize high quality and high speed generation of tally images. Herein, the tally generating time means the period until tally images are outputted since a halftone image is inputted.

Tally image generating method using threshold matrices can realize grouping function. At first, Matrix1, Matrix2, , , , Matrix X are generated. Then, Group1, Group2, , , , Group X are generated from each Matrix1, Matrix2, , , , Matrix X, respectively. Each group has a lot of tally images generated from a lot of various input gray-scale images. In decoding step, instructed number groups are selected. Any combination of a selected tally image from each selected Group can decode the confidential image. This grouping function has not been realized conventional halftone tally image generation methods such as Non-Patent Document 1 and 2. This function can be realized by Non-Patent Document 3 but no one propose this grouping usage. This grouping function can be easily realized by tally image generation method using threshold matrices.

Moreover, not only normal (2,2) method but also other method such as (k,n) method can be realized. In Non-Patent Document 5 of (k, n) scheme, overlapping any k share images decode the confidential image, but overlapping less than k−1 random share images can not decode the confidential image. Here, in conventional image, n is not the number of tally images, n is the number of groups. At first, n groups are generated. Then, more than k groups are randomly selected. Any combination of a selected tally image from each selected group can decode the confidential image. Some Halftone tally image generation method can support methods except (2,2) scheme. For example, Non-Patent Document 6 supports (k,n) scheme. Non-Patent Document 6 also supports general access structure, so access feasibility is very high. Non-Patent Document 7 supports (2, 3) scheme. However, Non-Patent Document 6 and 7 do not use threshold matrices, grouping of a lot of high quality tally images described above can not be realized.

SUMMARY OF THE INVENTION

An object of the invention is to provide a tally image generating method, a decoding method, a tally image generator, and a decoder, which can generate tally images with high quality in a short tally generating time, and can decode a high-resolution confidential image and flexibility of grouping function described above and extension to other access structure not only (2,2) scheme.

In order to accomplish the object, the first feature of this invention is that a tally image generating method comprises a first step for preparing a set of seed images that tally with each other, a second step for creating a set of threshold matrices from the set of seed images, and a third step for creating a plurality of tally images by using the set of threshold matrices.

Also, the second feature of this invention is that the tally image generating method, wherein the second step includes processing to create a plurality of different binary pattern images from a plurality of seed images that tally with each other, and processing to create a set of threshold matrices from the binary pattern images, and the processing to create the binary pattern images includes processing to exchange a set of pixels only within a region divided based on a confidential image without destroying the pixel set among the seed images.

Also, the third feature of this invention is that the tally image generating method, wherein, at the third step, a plurality of tally images are created by making binary from input gray-scale images by using a set of threshold matrices created at the second step.

A plurality of tally images created according to the invention are printed on transparent media, and the transparent media are irradiated with transmitting light, or calculation such as AND or OR operation is performed for each pixel, whereby a confidential image with high resolution can be decoded.

The invention can also be realized as a device with software or hardware.

According to the invention, tally images are created by using a plurality of threshold matrices, so that a set of tally images can be created at a high speed by comparing the densities (pixel values) of the respective pixels with thresholds of the threshold matrices.

According to the invention, generated tally images can have good grouping function and access structure except (2,2) scheme.

In addition, by generating threshold matrices by using a halftone technique such as a VC method (void-and-cluster method) that can generate halftone images with high visibility and high quality, a set of tally images with high visibility and high quality that are neither random nor have conspicuous regular patterns can be generated, and by superposing the created set of tally images, a confidential image can be decoded. In addition, the threshold matrices are not switched for each pixel of the confidential image, so that resolution lowering can be restrained.

BRIEF DESCRIPTION OF THE DRAWINGS

FIG. 1 is a drawing showing an example of matrix switching in a tally image generating method using a systematic ordered dither method;

FIG. 22 is a flowchart of another of the processing procedures for creating a threshold matrix set from a seed image set;

FIG. 23 is a flowchart of processing procedures for creating threshold matrices by region control;

FIG. 24 is a drawing of examples of tally images and a superposed image created by using threshold matrices created as in FIG. 23;

FIG. 31 is a drawing of examples of tally images and a superposed image (halftone images are identical to each other) created by using the threshold matrices created as in FIG. 22 from seed images generated by the GA method; and FIG. 32 is a drawing of examples of tally images and a superposed image (halftone images are different from each other) created by using the threshold matrices created as in FIG. 22 from seed images created by the GA method.

DETAILED DESCRIPTION OF THE PREFERRED EMBODIMENT

Figure 2:
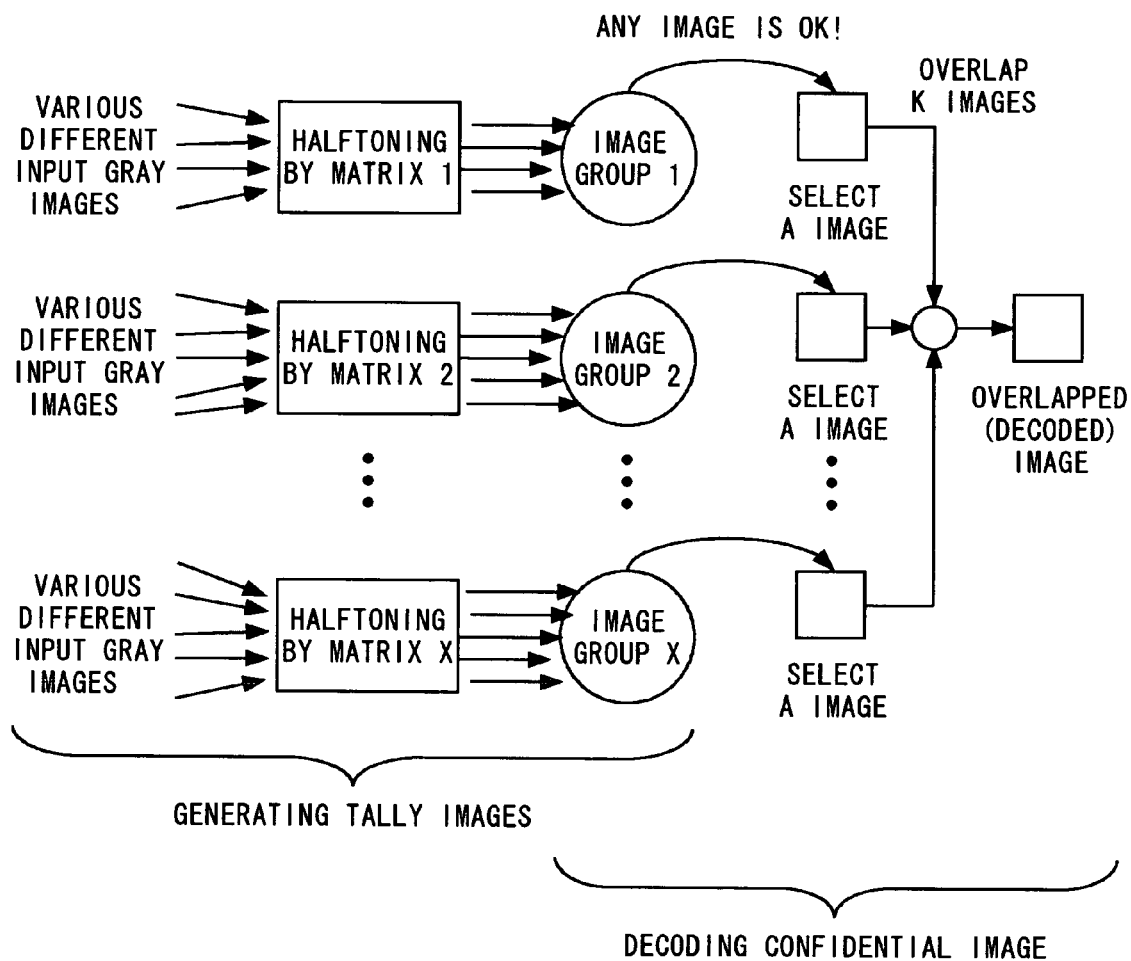
FIG. 2 is a drawing showing grouping function in a tally image generating method using threshold matrices.
Figure 3:
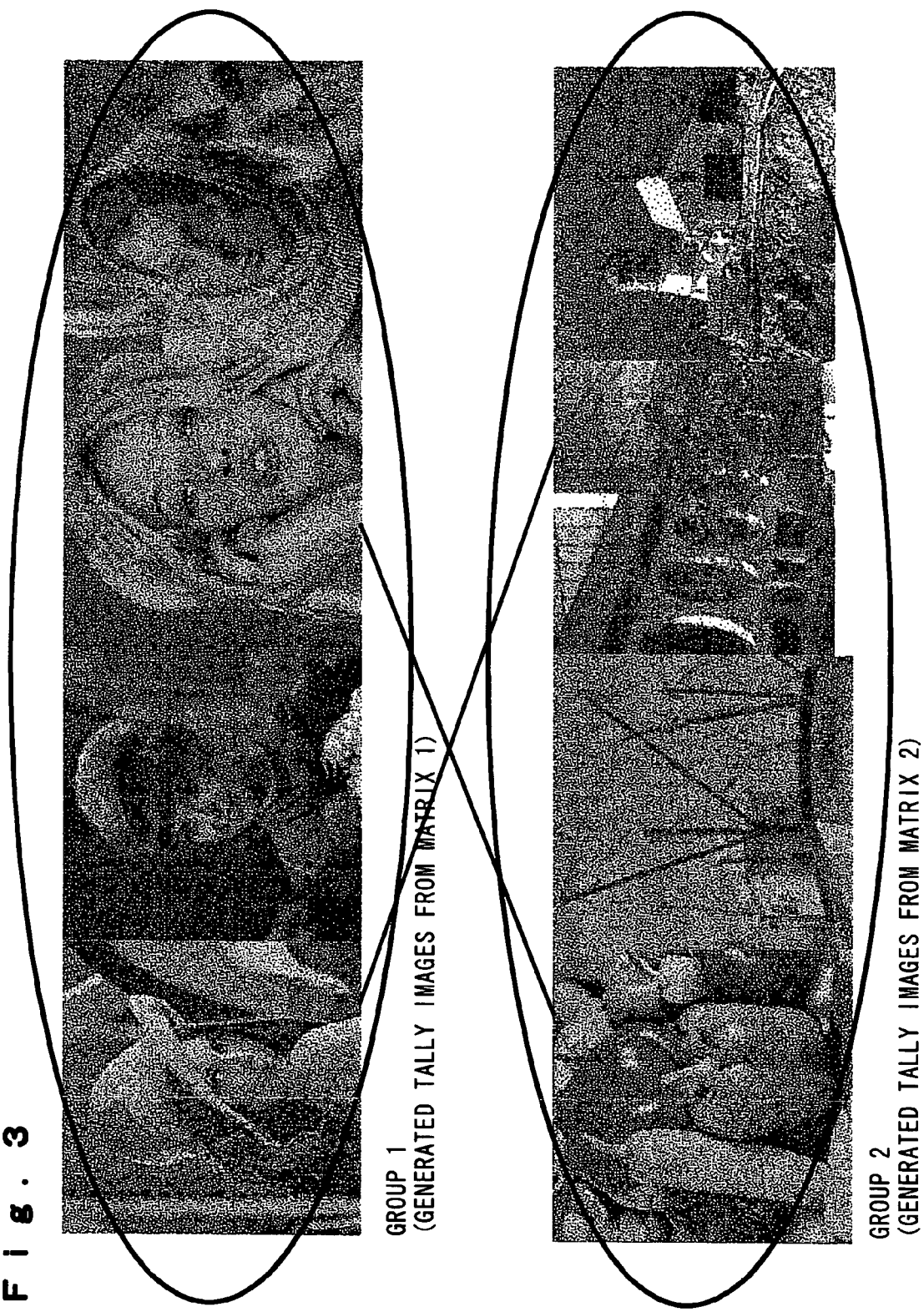
FIG. 3 is a drawing showing examples of generated tally images from matrix 1 and 2.
Figure 4:
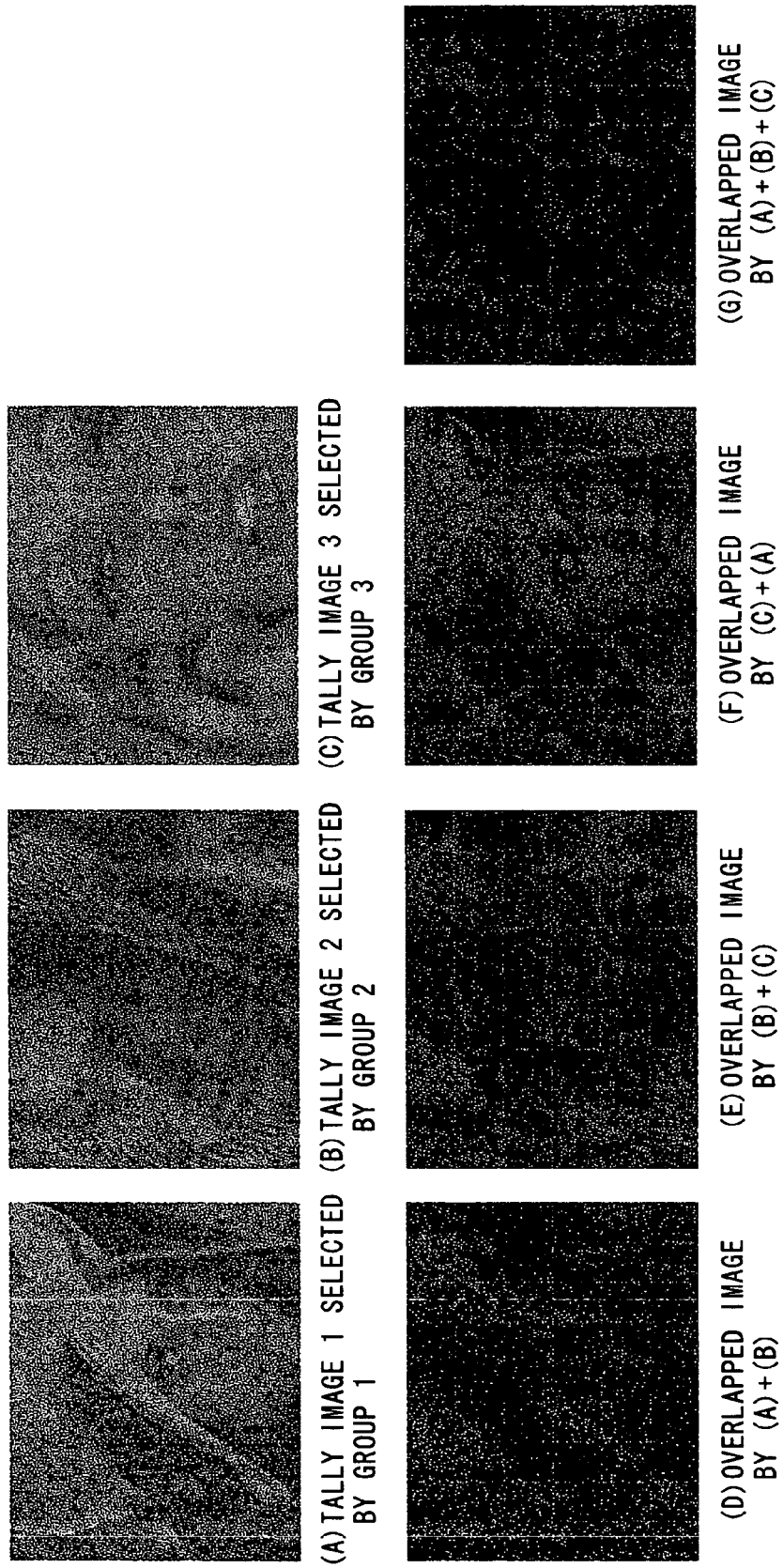
FIG. 4 is a drawing showing examples of selected tally images and overlapped images in (3.3) method.

The invention method is using plural threshold matrices, which realize the grouping function. The way of grouping tally image generation step and decoding step is described as follows. At first, Matrix 1, Matrix 2, , , , Matrix X are generated as shown in FIG. 2. Then, Group 1, Group 2, , , , Group X are generated from each Matrix 1, Matrix 2, , , , Matrix X, respectively. Each group has a lot of tally images generated from a lot of various input gray-scale images. FIG. 3 shows examples of generated tally images from matrix 1 and 2. In decoding step, instructed number groups are selected. Any combination of a selected tally image from each selected Group can decode the confidential image. FIG. 4 shows examples of selected tally images and overlapped images in (3.3) method.

The invention uses a halftone technique such as a VC method by which a halftone image with high visibility and high quality can be generated, so that the VC method is explained first. The VC method is described in the Non-Patent Document 4. The VC method is a method proposed for generating a halftone image by using a threshold matrix, and according to this method, a halftone image that is neither random nor has conspicuous regular unique patterns, and has high visibility can be generated.

Figure 5:
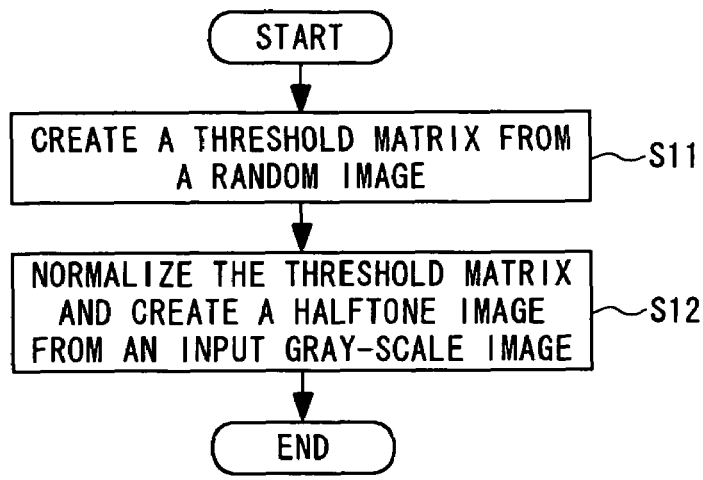
FIG. 5 is a flowchart of halftone image creating procedures according to the VC method.

FIG. 5 is a flowchart of halftone image creating procedures according to the VC method. As shown in this figure, the VC method includes a step (S11) for creating a threshold matrix from a random image and a step (S12) for normalizing the threshold matrix and creating a halftone image from an input gray-scale image by using the normalized threshold matrix.

Figure 6:
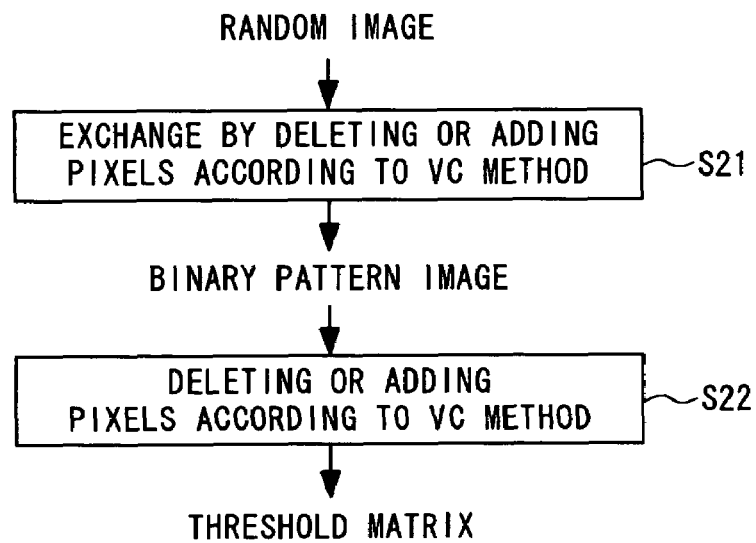
FIG. 6 is a flowchart of processing of S11 of FIG. 5.

S11 includes, as shown in the flowchart of FIG. 6, a step (S21) for generating a binary pattern image from the random image by means of exchange by deleting or adding pixels according to the VC method, and a step (S22) for creating a threshold matrix by deleting or adding pixels according to the VC method.

Figure 7:
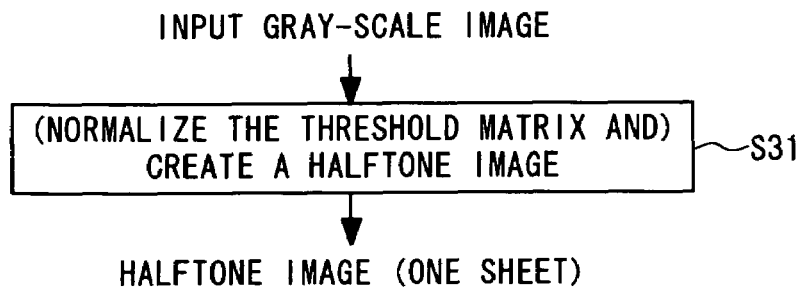
FIG. 7 is a flowchart of processing of S12 of FIG. 5.

As shown in the flowchart of FIG. 7, S12 includes a step (S31) for normalizing the threshold matrix created at S11 and creating a halftone image by comparing the normalized threshold matrix and the input gray-scale image.

Herein, the matrix size, the size of the input random image, and the size of the binary pattern image are defined as M×N. At S21, a random image composed of two values of white (1) and black (0) is inputted, and a binary pattern image composed of two values with high visibility is generated.

Figure 8:
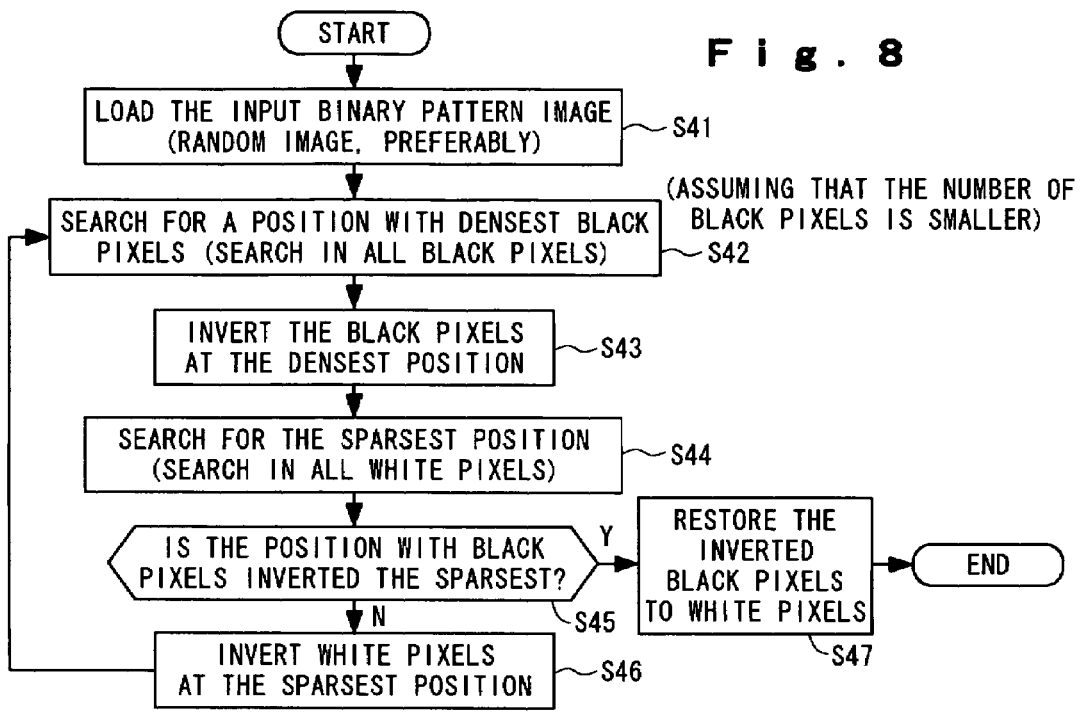
FIG. 8 is a flowchart showing the details of processing procedures of S21 of FIG. 6.

Although detailed description of the processing of each step is omitted since it is given in the Non-Patent Document 4, processing procedures of S21 are shown in detail in the flowchart of FIG. 8. As an overview thereof, a Gaussian filter is applied to the random image, and a densest portion in which remarkable pixels (remarkable pixels are either the smaller number of pixels of 0 or 1 in the random image) are densest is found and pixels are removed, and a sparsest portion in which the remarkable pixels are sparsest is found and an operation to add pixels is repeated (that is, pixels are repeatedly exchanged between the densest portion and the sparsest portion), and this pixel exchange is repeated until the densest portion from which the pixels are removed becomes similar to the sparsest portion. Normally, the threshold matrix is used by tiling, so that the densest and sparsest portion is also tiled and calculated.

Figure 9:
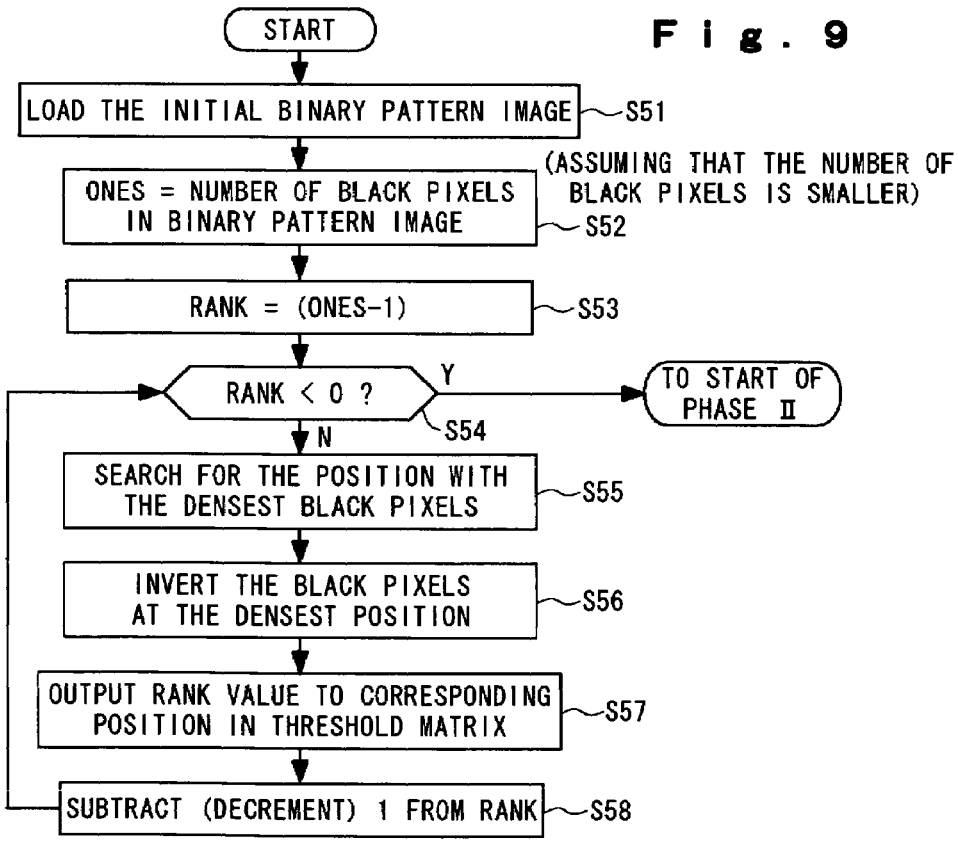
FIG. 9 is a flowchart showing the details of processing procedures of S22 of FIG. 6.
Figure 10:
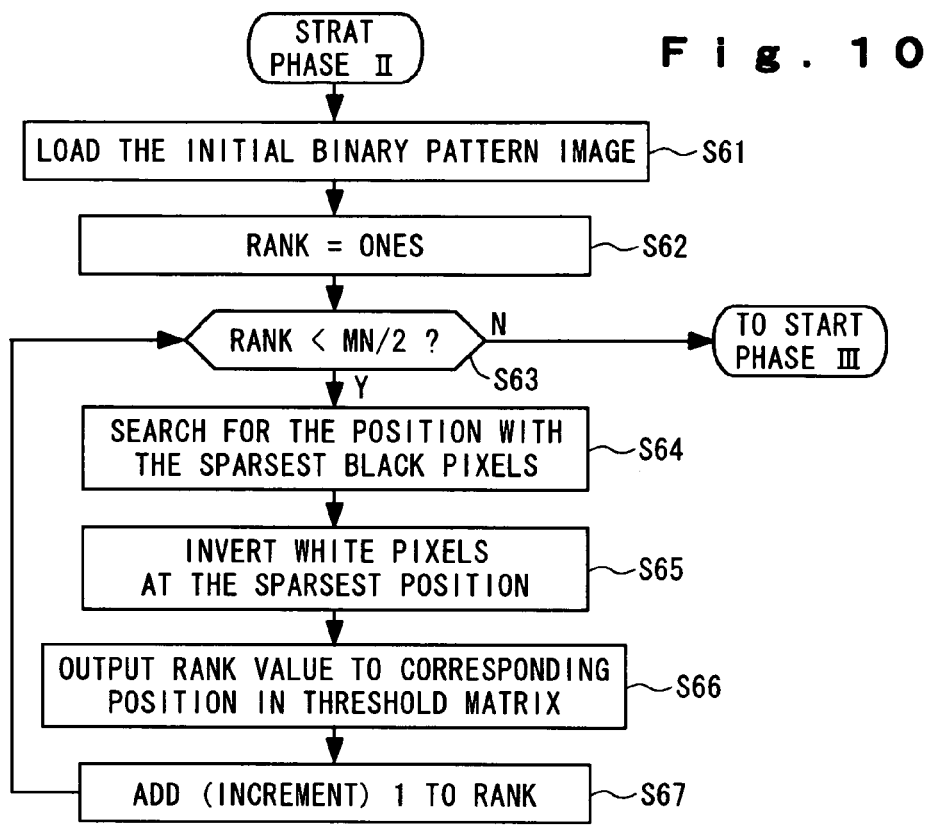
FIG. 10 is continued from the flowchart of FIG. 9.
Figure 11:
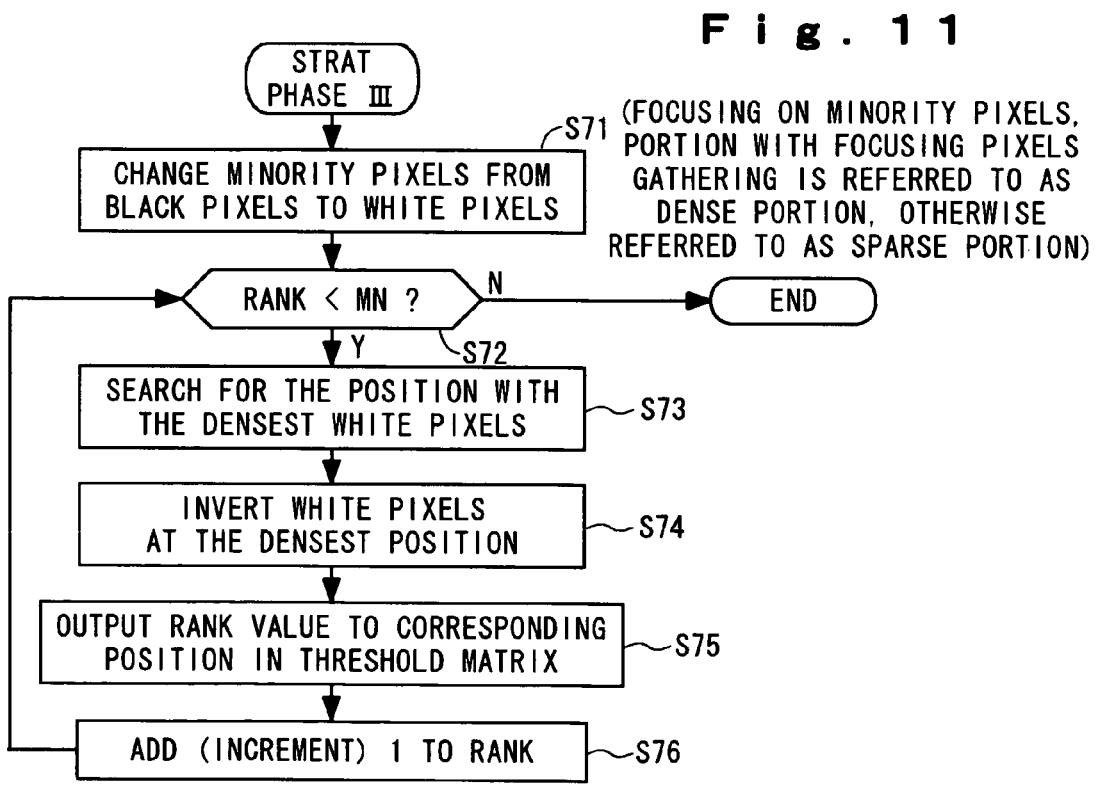
FIG. 11 is continued from the flowchart of FIG. 10.

Details of processing procedures of S22 are shown in the flowcharts of FIG. 9 through FIG. 11. At S22, the binary pattern image generated at S21 is inputted and a threshold matrix is created. In the threshold matrix, integers from 0 to M×N−1 are embedded.

The density of the input binary pattern image is defined as Dense. According to the flowchart, first, in order to create a threshold matrix, a visually favorable binary pattern image is generated from input binary pattern image. A threshold matrix will be designed so that that visually favorable binary image is created when an even gray image corresponding to the density Dense is inputted. Next, a threshold matrix is created so that when an uniform gray image having a black density slightly higher than the density Dense is inputted and binarized, a generated binary pattern image become the image that one black pixel is added to the sparsest portion. Thereby, a threshold matrix that can generate a binary pattern image with high visibility with respect to input values of various densities. Threshold matrix value is gradually increased by re-calculating the sparsest portion every time one black pixel is added to sparsest portion. The same applies to the portion with a low black density.

Next, the processing of S31 is explained. Herein, a halftone image is generated from an input gray-scale image by using the threshold matrix created at S22. When the number of tones of the input halftone image is defined as D, integers from 0 to N×M−1 in the threshold matrix are defined as t, and the number of tones of a halftone image to be generated is defined as X, as described in the Non-Patent Document 4, at S31, first, the threshold matrix is normalized by the formula (1). By this normalization, the threshold value becomes an integer from 0 to D−1. This integer is defined as t'. Next, by comparing the normalized threshold matrix and the input halftone image based on the formula (2), a halftone image with value of X is generated.

$$int[\{((D-1)/(X-1))*(t+1/2)\}/MN] \quad (1)$$

$$output = Quantize\{input + t'\} \quad (2)$$

In the case of a binary halftone image, when input gray-scale pixel value>t', the pixel value of an outputted halftone image is a white pixel, and otherwise the pixel value of a outputted halftone image is black pixel. To create a halftone image from a different input gray-scale image, unless the values of D and X change, the threshold matrix does not need to be normalized again. For example, in many cases, D=256 and X=2. In this case, the input image and the threshold matrix are only compared, so that a halftone image can be generated at a high speed.

Figure 12:
FIG. 12 is a drawing showing examples of a random image and a binary pattern image.
Figure 13:
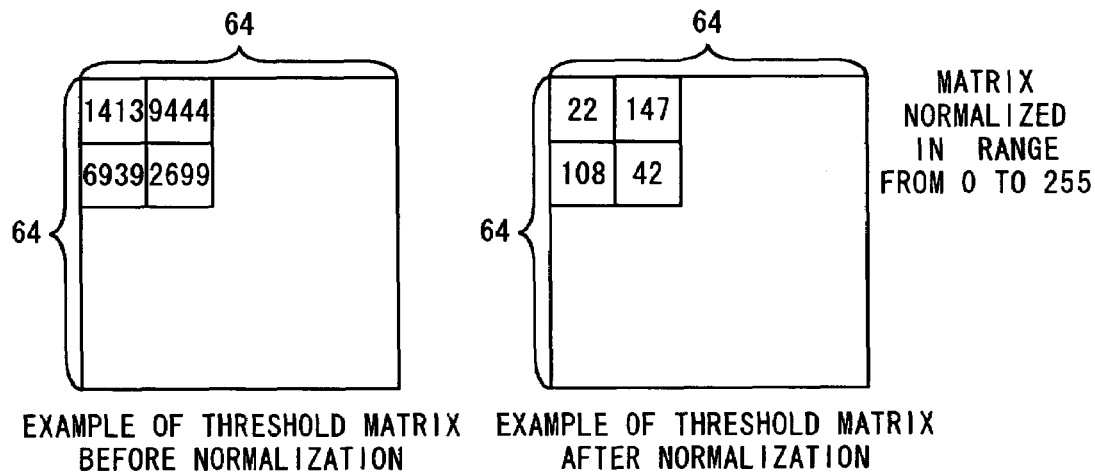
FIG. 13 is a diagram of examples of threshold matrices before and after normalization.

FIG. 12 shows examples of a random image and a binary pattern image generated from this random image according to the VC method. Herein, it is assumed that the image has 64×64 pixels. FIG. 13 shows examples of the threshold matrix before and after normalization.

Next, the invention is explained. The invention can be carried out as a device with software or hardware, however, a case where the invention is carried out as a method is explained.

Figure 14:
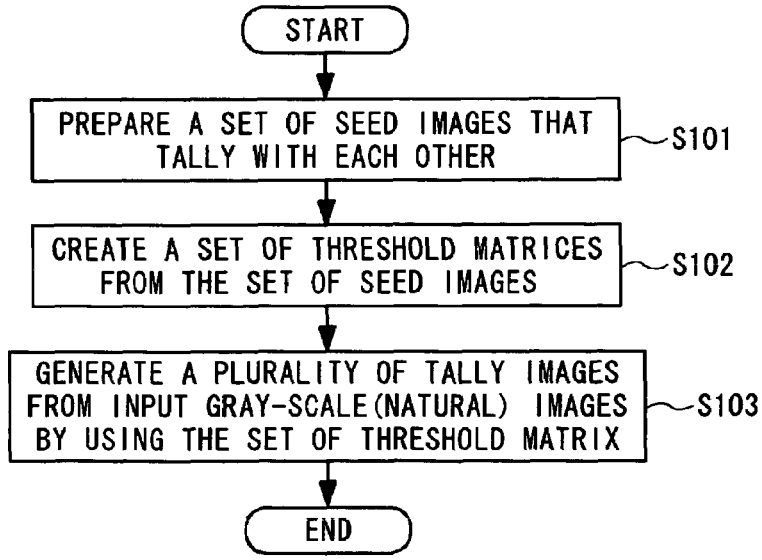
FIG. 14 is a flowchart of processing procedures in a tally image generating method according to the invention.

FIG. 14 is a flowchart of processing procedures in a tally image generating method according to the invention. First, a set of seed images that tally with each other are prepared (S101). Next, a set of threshold matrices are created from the set of seed images by using the VC method (S102), and a plurality of tally images are generated from input gray-scale images by using the set of threshold matrices (S103). The tally images thus generated are printed on transparent media, and the transparent media are irradiated with transmitting light, or AND operation is executed for each pixel, whereby a confidential image is decoded.

It is also possible that the threshold matrices themselves created at S102 or patterns obtained by processing the threshold matrices can be used as tally images. For example, patterns obtained by compressing the values of the threshold matrices within a predetermined range can be used as tally images.

Hereinafter, the processings are described in detail. In the processing to generate tally images by using threshold matrices (S103), generation of one tally image is the same as in FIG. 7 when an input gray-scale image is used, and the number of tally images to be generated just becomes plural, so that the processings of S101 and S102 are mainly explained hereinafter.

Figure 15:
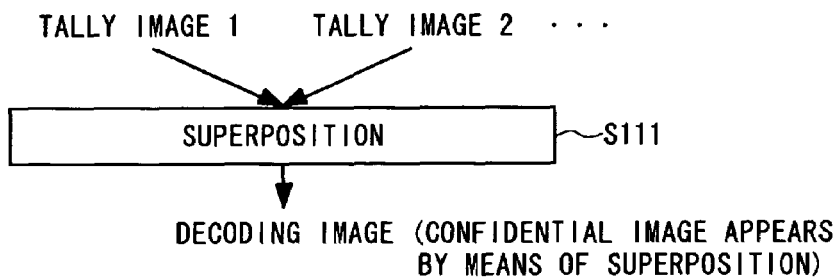
FIG. 15 is a flowchart of processing procedures of tally image decoding.

First, processing (S101) to prepare a set of seed images that tally with each other is explained. "Tally" means that a confidential image can be decoded by superposing a plurality of tally images in a set of tally images, that is, for example, as shown in FIG. 15, two tally images (for example, the tally image 1 and the tally image 2) in the set of tally images are superposed (S111), whereby a confidential image can be decoded.

When the tally image 1 and the tally image 2 are binary pattern images in white (1) and black (0), instead of superposition of S111, pixel values of the tally image 1 and the tally image 2 are multiplied, whereby a confidential image can be decoded. As a result, white (1)×white (1)=white (1), white (1)×black (0)=black (0), black (0)×white (1)=black (0), and black (0)×black (0)=black (0), and the pixels change in density in the decoding image, so that a confidential image can be decoded.

Figure 16:
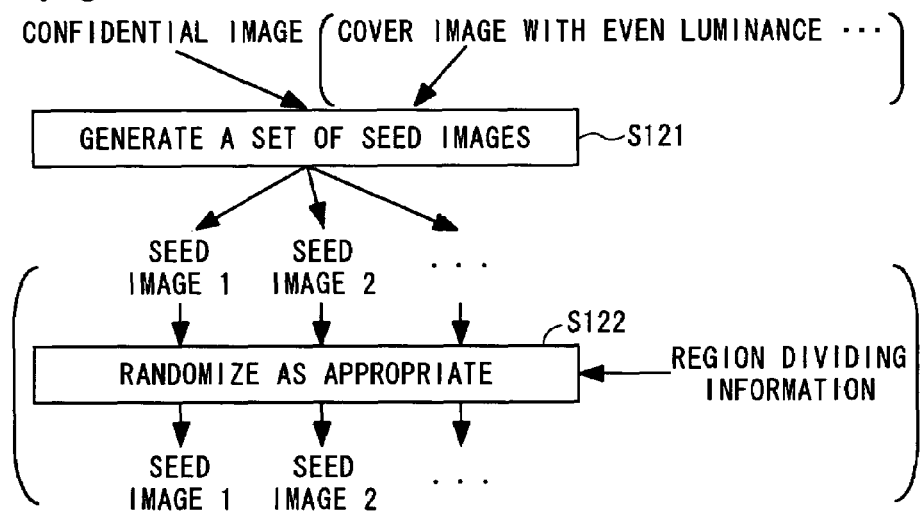
FIG. 16 is a flowchart of processing procedures of seed image setting preparation.
Figure 17:
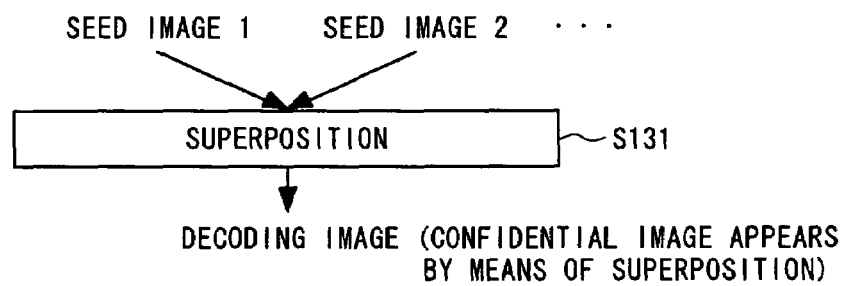
FIG. 17 is a flowchart of processing procedures of seed image decoding.

FIG. 16 is a flowchart of processing procedures of S101. As shown in FIG. 17, the seed images are characterized in that a confidential image can be decoded by superposing the seed images (S131) in the same manner as the tally images (see FIG. 15).

In FIG. 16, a set of seed images 1, 2 . . . are generated from a confidential image or from a confidential and cover image for embedding the confidential image (S121). As the method for generating the set of seed images, any of the tally image generating methods described in Patent documents 1 through 3 and Non-Patent Documents 1 through 3 and 5 and other tally generating methods in that a confidential image appears by means of superposition can be used.

The cover image is preferably an even (uniform) density image in a moderate tone for increasing the visibility of the confidential image. For example, when an even density image in a moderate tone is inputted in the GA method of the Non-Patent Document 2, a set of seed images with excellent visibility can be generated. One seed image generated by the tally generating method of the Patent Document 2 or 3 or the Non-Patent Document 5 is normally a random image with black pixels and white pixels that are the same in number, so an input cover image with even density is not needed.

As other method, In addition, set of random seed images with high confidential image resolution can be generated. Here, one pixel of a confidential image is embedded to one pixel of generated tally images. For example, to generate two random seed images 1 and 2 from a binary confidential image W1 (black (0), white (1)), X1 is defined as pixels to be outputted to the seed image 1 and X2 is defined as pixels to be outputted to the seed image 2, and when these are expressed in the form of (X1, X2), either (0, 1) or (1, 0) is randomly selected and outputted to the seed image 1 or 2 when W1=0, and either (0, 0) or (1, 1) is randomly selected and outputted to the seed images 1 and 2 when W1=1, whereby a set of seed images 1 and 2 that tally with each other can be generated. Here, make the black density of W1 and W2 as the same. If the black density is different, the confidential image will reveal on the binary pattern image1 and 2 after exchanging operation described in later (see FIG. 20). At this time, the confidential image W1 is embedded in the seed images 1 and 2 on a pixel basis, so that the resolution of the confidential image W1 is high.

A random seed image 3 that makes another confidential image W2 appear when it is superposed on the seed image 1 can also be generated. At this time, by outputting a pixel value different from that of the seed image 1 at W2=0 and outputting the same pixel value as that of the seed image 1 at W2=1, the seed image 3 can be generated. That is, (X1,X3)=(0,1) or (1,0) for W2=0, (X1,X3)=(0,0) or (1,1) for W2=1. Herein, the seed images 1, 2, and 3 are perfect random images. The confidential images of the seed images that become tallies can be a binary image or a multilevel image depending on the tally image generating method.

Tally image generating method is normally (2,2) scheme. Here, a tally image is a halftoned image from a gray-scale natural image.

Tally image generating method using threshold matrices can realize grouping function as described above. So invention method can realize grouping of a lot of high quality tally images due to VC method. Moreover, if random patterns generated by Non-Patent Document 5 is used as input seed images, (k,n) grouping scheme is realized with FIG. 2. Here, n does not mean the number of tally images, n means the number of Groups. k<=3 is favorable because the contrast of a decoded confidential image or quality of tally images deteriorate as k increases. The number of n does not have limit but the contrast of the decoded image lower as n increases when k is fixed, so big number of n is not favorable. Invention methods also can be applied to other access structure secret sharing or visual cryptography methods which create random patterns with even luminance such as Patent Document 2 and 3.

It is allowed that the set of seed images thus created are used as they are. However, for example, seed images generated according to the Non-Patent Document 5 have appearances of random images in moderate tone composed of white pixels and black pixels, however, sometimes, texture is observed at a second look. In most cases, this texture is caused due to guarantee of visibility of each minute block.

Therefore, when the seed images have unique texture, the texture is broken by randomizing as appropriate (S122), whereby a set of seed images are generated. When applying randomizing, if the positional relationship among dividing regions of the confidential image and the seed images is not considered, the superposing density (That is, the density after superposing seed images.) changes in each dividing region, resulting in deterioration in visibility. Therefore, to obtain tally images with high visibility, randomizing is not performed in each minute block, but is performed in the dividing regions by using region dividing information of the confidential image. Namely, randomizing is performed while the positional relationship among the tally images is reserved so as not to change the superposed pixel values in the dividing regions, whereby density changes during superposition for each dividing region are prevented and visibility is guaranteed. Or, when the seed images are created by the method of the Patent document 2 or 3 or the Non-Patent Document 5, instead of randomizing after the images are created, random images with no texture that does not guarantee the visibility in the blocks can be generated. For example, when a column vector of a generator matrix corresponds to a set of pixels, and the number of rows n is equal to the number of tally images, by generating a set of seed images by randomly selecting a column vector with a probability of 1/(the number of column), texture can be prevented from being generated.

Figure 18:
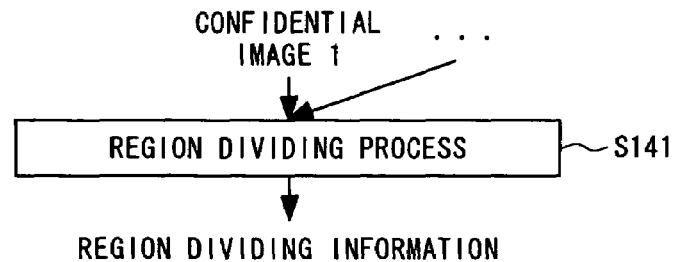
FIG. 18 is a flowchart of processing procedures of confidential information region dividing.

FIG. 18 is a flowchart of processing procedures for obtaining region dividing information of a confidential image. In the region dividing processing (S141), dividing into regions is performed by using the characteristics of the confidential image, and region dividing information is obtained. For example, when the confidential image is a monochrome text image, the image is divided into a character region and a background region. When the confidential image is a multi-level image, it is divided into regions by using several thresholds.

As in the case of the Patent documents 2 and 3, when a plurality of confidential images k exist, each confidential image is divided into WNi (i=1, 2 . . . , k) regions, and dividing regions are determined based on combination differences among the divided regions. The dividing regions in this case are WN1×WN2× . . . WNk regions.

Figure 19:
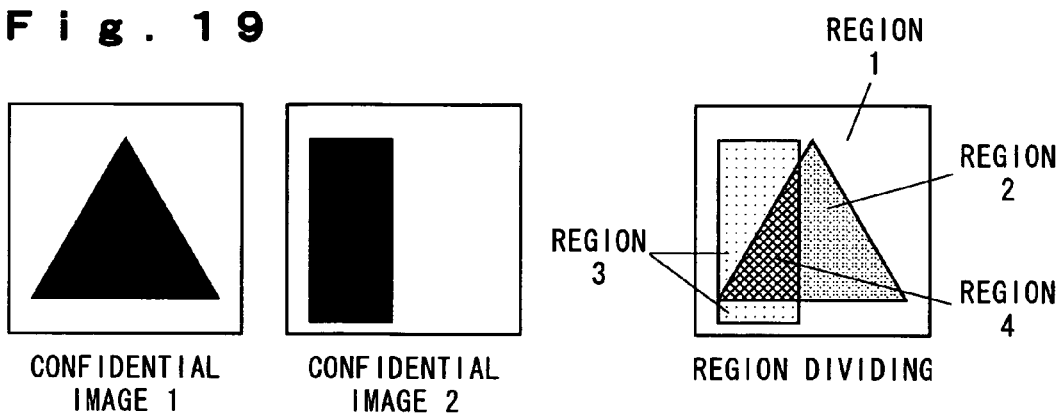
FIG. 19 is an explanatory view of region dividing of a plurality of confidential images.

For example, two confidential images exist and each can be divided into two regions, WN1=2 and WN2=2, so that the dividing regions are WN1×WN2=4. As shown in FIG. 19, when two triangle and square black character images are the confidential images 1 and 2, the dividing regions become four of [background region (region 1)], [region in which only the triangular character is in black (region 2)], [region in which only the square character is in black (region 3)], and [region in which both the triangular and square characters are in black (region 4)]. When the confidential image is composed of geometrically cut images, this cut portion can be further divided into regions. It is also possible that region dividing is performed while providing a predetermined region near a boundary of the dividing regions to selectively process the vicinity of the boundary, or the dividing regions overlap each other in order to prevent the region boundary from revealing. It is also possible that region dividing is performed upon estimating a confidential image from the plurality of tally images.

The pixel exchange procedures based on dividing regions in randomizing to break the texture while guaranteeing the visibility are the following (1) and (2).

(1) Pixel values at the same positions among the plurality of seed images are defined as a pixel value set (X1, X2, X3 . . . ). This pixel value set is not destroyed.

(2) The pixel value set is exchanged only in the dividing regions.

For the exchange of the pixel value set, when perfect randomizing is desired, all positions of the pixel value set are randomly redetermined, and otherwise two positions are randomly selected and an operation to exchange the pixel value set is repeated an appropriate number of times. In the later case, the dividing regions are gradually randomized by repeating the operation to exchange the pixel value set, however, in some cases, the random level changes among the dividing regions. To prevent this, the number of exchanges is determined in proportion to the dividing region area.

The randomizing described above is also effective in a method with high functionality in which three or more seed images are generated and control based on the number of seed images or control based on the combination are possible as in the case of the Patent documents 2 and 3 and the Non-Patent Document 5.

Figure 20:
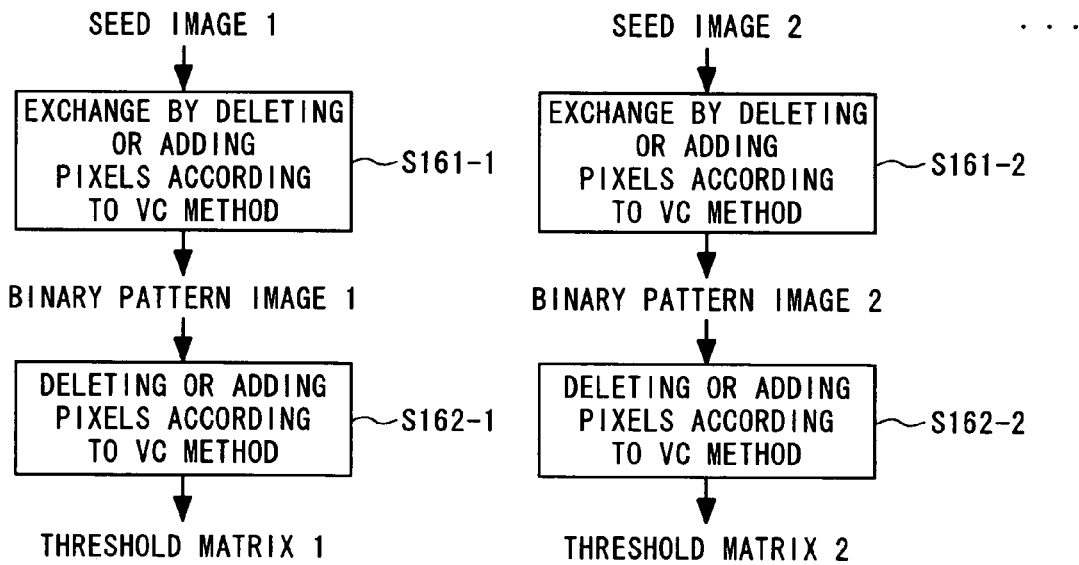
FIG. 20 is a flowchart of processing procedures for creating a threshold matrix set from a seed image set.
Figure 21:
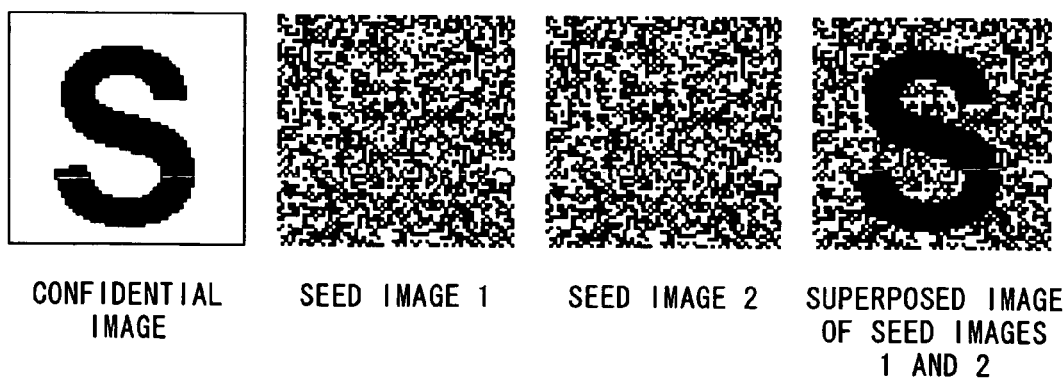
FIG. 21 is a drawing of examples of seed images created by means of random tally.

Next, processing procedures for creating a set of threshold matrices from the set of seed images (S102) are explained. FIG. 20 is a flowchart of the processing procedures. Herein, a plurality of seed images 1, 2 . . . that tally with each other are inputted, and a plurality of threshold matrices 1, 2 . . . are created. FIG. 21 shows examples of the seed images 1 and 2 according to random tally, and herein, the confidential image is "S." The seed images 1 and 2 tally with each other, so that by superposing these, the confidential image "S" appears.

Hereinafter, a processing system for the seed image 1 is explained, and the same applies to other seed images 2 . . . . First, image exchange by deleting or adding pixels is performed according to the VC method to generate a binary pattern image 1 from the seed image 1 (S161-1). Next, pixel deletion or addition is performed according to the VC method to generate a threshold matrix 1 from the binary pattern image 1 (S161-2).

In the Non-Patent Document 4, by inputting one random image, one threshold matrix is generated, however, in the invention, a plurality of matrices are generated by inputting a plurality of seed images that tally with each other. Basic processing is the same.

The seed images 1, 2 . . . are processed by the VC method, so that in the exact same manner as in generation of a halftone image by the VC method described in Non-Patent Document 4, a set of threshold matrices 1, 2 . . . that can generate tally images without any image quality deterioration can be created. When pixel exchange according to the VC method is performed, in the case of two seed images obtained by random tally, the binary pattern images 1 and 2 have a certain level of tally, and the tally is reserved to some extent even after pixel deletion and addition according to the VC method, so that a set of threshold matrices 1 and 2 that tally with each other can be created without a lowering in image quality.

In addition, the threshold matrices 1 and 2 generated from the binary pattern images 1 and 2 by pixel deletion or addition according to the VC method also has tally characteristics so the generated tally images generated by those threshold matrices can decode the confidential image. The pixel set of tally image (X1, X2) is similar to pixel set of seed image (X1, X2), so the decoded image by overlapping tally images is similar to the decoded image by overlapping seed images. Here, assume that the densities of seed images are ½. The black pixel of a seed image becomes more than MN/2 threshold matrix value while white pixel of a seed image becomes less than MN/2 threshold matrix value by the procedure of S161-1, S162-2. Threshold value of more than MN/2 tend to generate a black pixel of a tally image, the threshold value of less than MN/2 tend to generate a white pixel of a tally image, so the pixel set (X1, X2) of seed and tally images are similar.

Thereafter, generation of a threshold matrix by using another seed image 3 is also possible. Thereby, a set of threshold matrices that tally with each other can be created from the seed images 1 and 2 or 1 through 3 or 1 through n. The seed images can be created by any method as long as they tally with each other.

FIG. 22 is a flowchart of another of the processing procedures (S102) for creating a set of threshold matrices from a set of seed images. In these processing procedures, pixel deletion or addition according to the VC method is performed to directly create the set of threshold matrices 1, 2 . . . from the seed images 1, 2 . . . (S191-1, S191-2 . . . ). The seed images inputted herein can be created by any method as long as the images tally with each other. For example, seed images generated by Non-Patent Document 1 and 2 can be used. In these cases, a seed image is generated by inputting a cover image with even luminance instead of inputting a gray-scale natural image. In addition, binary pattern images 1, 2 . . . separately created by the same processing as S161-1, S161-2 . . . of FIG. 20 can be used as seed images 1, 2 . . . in FIG. 22.

Next, in order to increase the visibility of the confidential image generated by overlapping the binary pattern images 1, 2 . . . , and as a result, in order to create threshold matrices that can generate tally images with high visibility, a method of region control based on the dividing region information (see FIG. 18) is explained.

FIG. 23 is a flowchart of processing procedures to create threshold matrices by this method. As in the case of randomizing for pixel exchange (see FIG. 16), unless the positional relationship of the dividing regions and seed images is considered in pixel value exchange, the density changes in each dividing region when superposing, resulting in deterioration in visibility. Therefore, a pixel exchange operation closed in the dividing regions is performed by using the region dividing information of the confidential image, and the positional relationship (X1, X2, , , ) called pixel set of the seed images is reserved so as not to change the superposed pixel values within the dividing regions after pixel exchange by deletion or addition according to the VC method, that is, sparse and dense pixels are exchanged to generate binary pattern images 1, 2 . . . (S201-1, S201-2, . . . ). Thereby, density changes by superposition in each dividing region are prevented and decoded confidential image visibility is guaranteed.

Next, in the same manner as in FIG. 20, pixel deletion or addition according to the VC method is performed to generate threshold matrices 1, 2 . . . from the binary pattern images 1, 2 . . . (S202-1, S202-2 . . . ). S162-1, S162-2, S202-1 and S202-2 are the same procedure as S22 in FIG. 6.

Procedures of pixel exchange to prevent density changes by superposition while guaranteeing the visibility are the following (1) and (2).

(1) Pixel values at the same position among the plurality of seed images are defined as a set of pixel values (X1, X2, X3 . . . ). This pixel value set is not destroyed.

(2) The pixel value set is exchanged only within the dividing regions.

Thereby, the densities in the dividing regions when superposed become the same between before and after applying the VC method, whereby the visibility of the confidential image is improved more than in FIG. 20.

A position for pixel exchange can be randomly selected, however, in the VC method, a densest portion and a sparsest portion are calculated by using the method such as a Gaussian filter, and a position according to the results of calculation is selected. In this case, a densest portion or sparsest portion is not always at the same position among the seed images, so that in such a case, the position to be defined as a densest or sparsest portion is determined by, for example, the following methods.

(1) By using values of dense portions or sparse portions calculated for every seed image, weighted sums in the dense or sparse portions in a pixel value set are calculated, and a densest portion or a sparsest portion are determined.

(2) By using values of dense portions or sparse portions calculated for one seed image, a densest portion or a sparsest portion for all seed images are determined.

(3) By using a maximum and a minimum of values of dense portions or sparse portions calculated for every seed image, a densest portion or a sparsest portion are determined.

The pixel exchange in the dividing regions can be executed by the following methods for instance.

1) Choose one seed image randomly from plural seed images. 2) Find densest pixel location on the chosen seed image and determine the belonged region (region 1 or 2 or , , , or n). 3) Find the sparsest pixel location in the same region of the chosen seed image, under the condition that the densest pixel is inverted to white. 4) Exchange the densest and the sparsest pixel on the chosen seed image. The same exchange procedure is applied on the other seed images at the same location as the first seed image. That is, pixel set of (X1, X2 , , , Xn) of densest and sparsest location is exchanged within the same region. Repeat from 1) to 4) procedure until termination condition S45 described in FIG. 8 is satisfied on either seed image1 or 2 or , , , or n in one or multiple region. Termination condition is changeable. If the quality of a seed image is not enough, exchange procedure can be continued until the termination condition S45 is satisfied for the seed image at the cost of the visibility of decoded confidential image.

FIG. 24 shows examples of the binary pattern images 1 and 2 generated by pixel exchange, and the binary pattern images 1 and 2 reserve a certain level of tally, so that by superposing these, the confidential image "S" appears.

Figure 25:
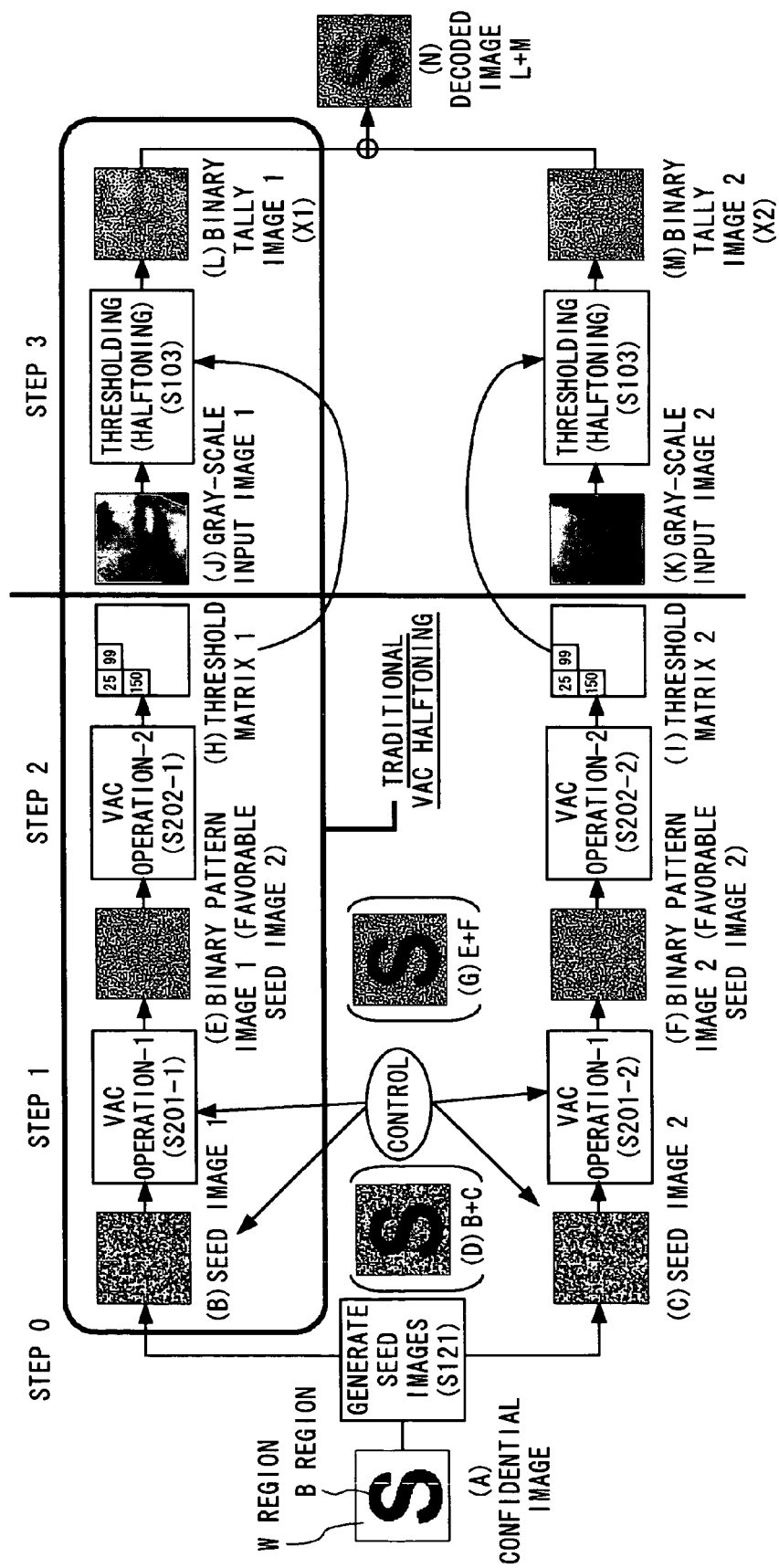
FIG. 25 is a conceptual block diagram showing a tally image generating method according to FIGS. 16 and 23.

FIG. 25 is a conceptual block diagram showing a tally image generating method according to FIGS. 16 and 23. Here, step 0 corresponds to S121 in FIG. 16.

It is also possible that one more threshold matrix that is a tally is created by using the region dividing information of the confidential image by depending on a threshold matrix that has been created. In this case, one threshold matrix is created according to conventional VC method (FIG. 5), and by using the created threshold matrix, another matrix can be created.

For example, an image with even density is applied to one threshold matrix that has been created by the conventional VC method to create a first binary pattern image, and a second binary pattern image that tallies with the first binary pattern image is created from the first binary pattern image and the confidential image. Next, a second threshold matrix is created from the second binary pattern image.

By this method, not only can the threshold matrices be easily created, but also arbitrary hierarchical tally images can be created. Hereinafter, this method is explained by assuming that the confidential image is a binary image. As a matter of course, the confidential image is not limited to a binary image.

Figure 26:
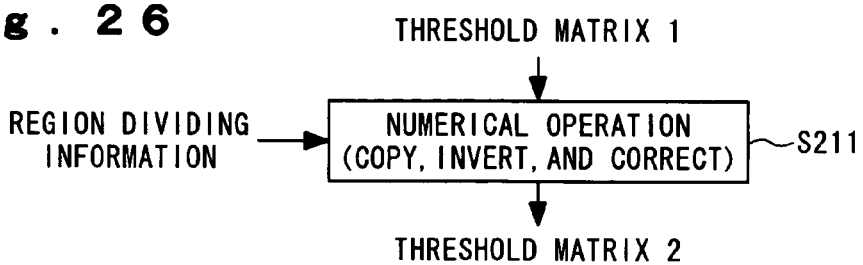
FIG. 26 is a flowchart of processing procedures for creating, by depending on one threshold matrix, other threshold matrices.

FIG. 26 is a flowchart of processing procedures to create the threshold matrix 2 depending on the threshold matrix 1, and the threshold matrix 2 is generated by numerically operating the threshold matrix 1 and the dividing region information (S211). The numerical operation copies, inverts, and corrects values of the threshold matrix.

For example, the confidential image is divided into a character region and a background region by means of region dividing. For the background region, the values t (0 to MN−1) of the threshold matrix 1 are copied as they are to the threshold matrix 2, and for the character region, the values t (0 to MN−1) of the threshold matrix 1 are embedded in the threshold matrix 2 by turning these from an intermediate value MN/2.

It is also possible that, for the background region, the values t (0 to MN−1) of the threshold matrix 1 are copied as they are to the threshold matrix 2, and for the character region, the values of the threshold matrix 1 are embedded in the threshold matrix 2 while exchanging the positions. If the rule of this position exchange is random, this lowers the visibility, so that as the change rule, for example, a maximum threshold and a minimum threshold are exchanged, and then exchange between second largest and second smallest thresholds is repeated until all threshold value is inverted (exchanged).

In the latter case, values existing in one threshold matrix are between 0 and MN−1, and this is the same as in a normal matrix, so that there is no possibility that the threshold matrix 2 is known as a threshold matrix for creating tallies even by examining the values in the threshold matrix 2.

In both the former case and the latter case, tally images with comparatively excellent quality at the character region central portion can be generated. However, in the tally images created by the threshold matrix 2, boundaries of the dividing regions easily become conspicuous and have a problem in confidentiality. In particular, when thresholds of two adjacent pixels perpendicular to the boundary of the dividing regions are summed up and averaged, the confidentiality problem increases as the average moves apart from other region's average. This problem can be reduced by making correction so that positions and thresholds of averages equal to or more than MN/4 move apart from other region's average are found and thresholds are exchanged among these.

Figure 27:
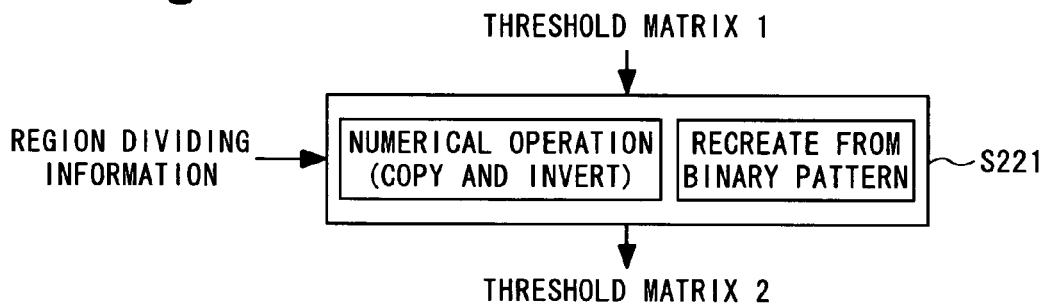
FIG. 27 is a flowchart of another of the processing procedures for creating, by depending on one threshold matrix, other threshold matrices.

FIG. 27 is a flowchart of another of the processing procedures to create the threshold matrix 2 by depending on the threshold matrix 1. This is an example of region control to increase the confidentiality of the confidential image when creating the threshold matrix 2 and prevent boundaries of the confidential image from becoming conspicuous on tally images.

In the processing (S221) to create the threshold matrix 2 by depending on the threshold matrix 1, for example, for the background region, the values of the threshold matrix 1 are copied as they are to the threshold matrix 2. For the character region, values of the threshold matrix 1 in the character region are found and used as a threshold set for the threshold matrix 2. The values of the threshold matrix 2 in the character region are redetermined by recreating the binary pattern image 2.

To recreate the binary pattern image 2, first, a density Dense is inputted in the threshold matrix 1 to obtain a binary pattern image 1. For a background image, the binary pattern image 1 is copied to the binary pattern image 2. For a character region, the threshold matrix 1 is inverted at the intermediate value MN/2 of the threshold set and values when inputting the density Dense are outputted as a binary pattern image 2. If the density Dense is in a moderate tone, an image obtained by white-black inverting the binary pattern image 1 is obtained as a binary pattern image 2. Thereafter, density calculation is performed only within the character region and pixels are deleted or added, whereby the binary pattern image 2 is recreated. For reducing the amount of calculation, the calculation region can be limited to the pixels around the boundaries. Thereby, boundaries of the confidential information can be prevented to some degree from appearing on the binary pattern image 2.

It is also possible that the character region is formed into a random image at a same density as the density Dense, or an image mixed with a binary pattern image calculated from the threshold matrix 1 and a random image to recreate the binary pattern image 2. For example, only the vicinity of boundaries of the character region can be formed into a random image.

Figure 28:
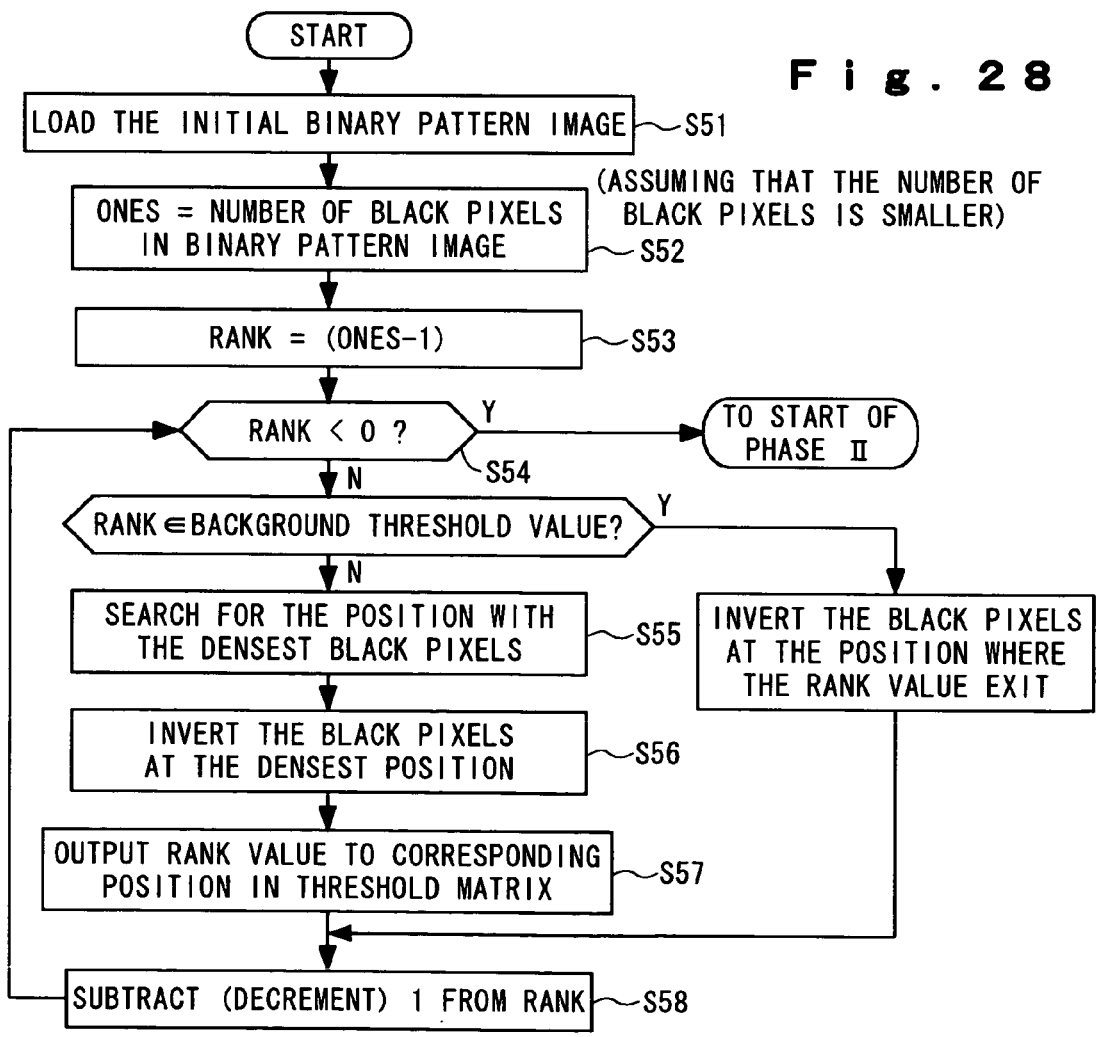
FIG. 28 is a flowchart showing the processing procedures for determining threshold value of character region of matrix 2.
Figure 29:
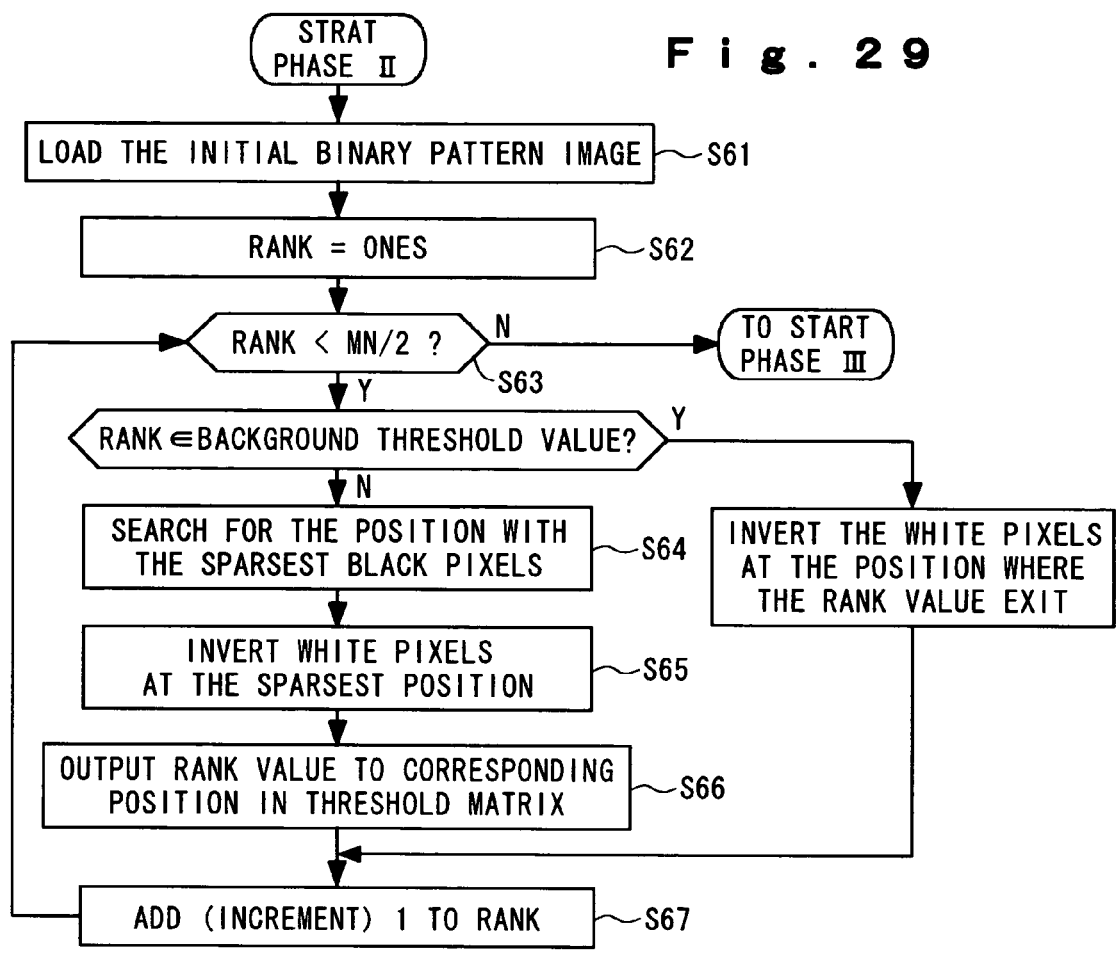
FIG. 29 is continued from the flowchart of FIG. 27.
Figure 30:
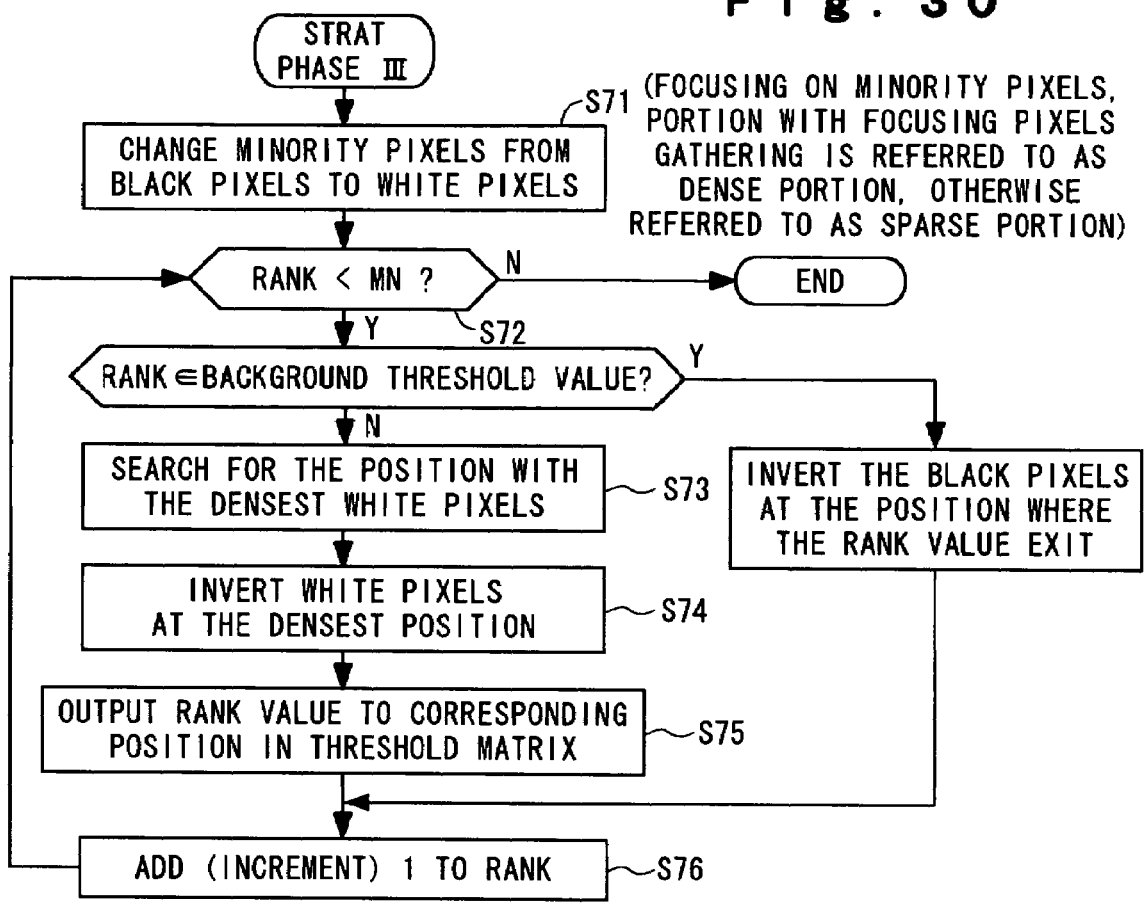
FIG. 30 is continued from the flowchart of FIG. 28.

Thereafter, by calculating density from the recreated binary pattern image 2, values of the threshold matrix 2 are determined. At first, in the background region, threshold values of threshold matrix 1 are copied to threshold matrix 2. This copying operation reserves the contrast of the decoded confidential image. Next, threshold values of matrix 2 in the character region are determined according to the flowchart of FIG. 9, FIG. 10 and FIG. 11. Generated binary pattern image 2 from threshold matrix 1 is loaded as a binary pattern image in FIG. 9. If the value of RANK does not exit in background region, that value of RANK can be used for character region. So, only if the RANK value does not exit in background region, calculate the densest or sparsest position and output rank value for character region. Those procedure are figured in FIG. 28, FIG. 29 and FIG. 30. Here, binary pattern 1 and 2 generated by FIG. 23 can be also used. In this case, at first, threshold matrix 1 is generated from a seed image by using FIG. 6 (S22). Then, threshold matrix 2 is generated by using threshold matrix 1. In detail, threshold values of matrix 1 is copied to matrix 2 in background region, then, in character region, FIG. 28, FIG. 29 and FIG. 30 is applied. If you make n groups of tally images (n>=3), FIG. 28, FIG. 29 and FIG. 30 procedure can be used. At first, n binary pattern images are generated. Then, matrix 1 is generated. The other n−1 matrices are generated depending on matrix 1.

FIG. 31 and FIG. 32 are drawings of examples of tally images 1 and 2 created by using the threshold matrices 1 and 2 created according to FIG. 23 from seed images as FIG. 21, and a superposed image obtained by superposing these tally images. FIG. 31 shows an example in which input gray-scale images to be inserted into the tally images 1 and 2 are made identical to each other. FIG. 32 shows an example in which input gray-scale images to be inserted into the tally images 1 and 2 are made different from each other, and two input halftone images are superposed and faintly appear on the superposed image. In these examples, the confidential image is "S."

According to the invention, by creating one time a set of threshold matrices in which a fixed confidential image appears, a set of tally images can be created at a high speed only by threshold comparison even when the input halftone images are many.

When using the invention in an educational tool, by creating one time a plurality of threshold matrices in which a confidential image "correct" is embedded and a plurality of threshold matrices in which a confidential image "incorrect" is embedded, a large amount of high-quality tally images can be generated at a high speed. For example, a large amount of educational content in which "correct" appears by superposing a tally image 1 and a tally image 2 and "incorrect" appears by superposing the tally image 1 and a tally image 3 can be created at a high speed. In this case, by commonly using one seed image 1, a set of threshold matrices satisfying the relationship described above can be created for the pair of tally images 1 and 2 and the pair of tally images 1 and 3. In the pair of the tally images 1 and 2 and the pair of tally images 1 and 3, for example, as shown in FIG. 20, threshold matrices can be created without region control. Seed image 1 is generated at first. Seed image 2 is generated by copying pixels of seed image 1 in background regions, and by turning pixels of seed image 1 in character regions. Seed image 3 is generated by copying pixels of seed image1 in background regions, and by turning pixels of seed image 1 in character regions. Those seed images are inputted. In this case, the image quality equivalent to the halftone image generated by the VC method is guaranteed.

Even when region control is performed as shown in FIG. 23 and the threshold matrices $1_2$ and $1_3$ do not become equal to each other, a set of threshold matrices can be created by using, for example, the threshold matrix $1_2$ as a representative. In addition, as shown in FIG. 26 and FIG. 27, by creating another threshold matrix by depending on one threshold matrix, a set of threshold matrices can be created. When a threshold matrix for the pair of tally images 1 and 2 is available, a set of threshold matrices can be created by creating a threshold matrix $1_3$ from the threshold matrix $1_1$ by using FIG. 26 or FIG. 27.

In the invention, each color image for a each tally image is decomposed into layers of RGB or YMC. A color confidential image is also decomposed into layers. Three pair of matrices are generated for each color. For example for red color, matrix R1 and matrix R2 in which decomposed red confidential image is embedded are generated. After Tally images of the respective layers are created, the tally images are superposed to create a high-quality 2 color tally image. For example for tally image1, generated images from matrix R1 and matrix G1 and matrix B1 are superposed. It is also possible that a set of threshold matrices in which the same confidential image is embedded in each layer can be created.

It is also possible that tally images are created for each frame of a moving image. According to the invention, a large amount of frames of a moving picture can be processed at a high speed to create tally moving images. In the case of a color moving image, as described above, it is decomposed into layers and processed, whereby tally moving images can be created. One tally moving image series is considered as a sequence of frames superposing binary images of RGB. One moving color image is decomposed into layers. Tally images for each color are generated by each matrix R1 and B1 and G1. Then, images of every frame are superposed. Thus one moving color tally image is generated. For the other color tally moving image generation, matrix R2, B2 and G2 are used. By switching and displaying the frames of tally moving images, a confidential image can be visually decoded. For example, a confidential image is decoded by alternately switching and displaying a frame of a series 1 and a frame of a series 2. In the tally image generating methods proposed in the Non-Patent Document 1 and the Non-Patent Document 2, it takes time to generate the tally images, and small changes in input images completely differ the tally pattern to be generated, and the confidential image is averaged and disappears by high-speed switching display of a moving image, so that the confidential image cannot be decoded. On the other hand, according to the invention, the pixel layout patterns of tallies to be generated are hardly changed by small changes of input images, so that the patterns easily remain in some portions and are averaged in some portions when high-speed switching display is performed for the moving image, so that the confidential image can be made to appear.

In addition, random tallies including two tallies in which a binary confidential image is embedded are equal to one-time pad codes and are safe in terms of information theory, there is no possibility that the confidential image leaks from one tally. The safety is guaranteed even in a threshold matrix generated by the processing of FIG. 20 by using the random tally as a seed image without the region control of FIG. 23. Namely, there is no possibility that the confidential image leaks from one of the tally images created from the threshold matrices. In addition, it is guaranteed that the image quality of one tally image generated by using a random tally as a seed image is completely the same as that of a halftone image created by the VC method, and a confidential image can be decoded by superposition. Therefore, tally image generation that algorithmically guarantees not only high speed but also the image quality and safety as high as before applying tallies becomes possible at the cost of visibility of the decoded confidential image in FIG. 16.

In addition, by using the tally images created by the (k, n) method of the Non-Patent Document 5 and the tally images created by the tally image generating method of the Patent document 2 or 3 as a seed image, a set of threshold matrices that can generate tally images with high functionality can be created. For example, according to the (k, n) method, a confidential image can be decoded only when arbitrary k tally images among n tally images are superposed. In detail, when the (3, 3) method is used, function control is possible in that a confidential image cannot be decoded even by superposing two tally images among three, however, the confidential image can be decoded by superposing three.

According to the Patent documents 2 and 3, a graph is prepared, a system can be configured which, by superposing arbitrary two tally images, decodes a confidential image different depending on a distance of the images. In detail, a system can be configured in which, when assuming a graph that has vertexes s1, s2, s3, s4, and s5, and sides connecting s1-s2, s2-s3, s3-s4, s4-s5, and s5-s1, by superposing tally images of s1-s2 and s2-s3, the character "1" can be decoded, and by superposing s1-s3, the character "2" can be decoded. Thus, different secret image is decoded.

High functional tally images are conventionally random and meaningless. Therefore, these tally images are used as seed images and gray-scale images are inserted into the tally images, whereby meaning can be given to the tally images. It is difficult that a person who holds a large amount of random tally images manages these since he/she cannot distinguish the images, however, by inserting meaningful images into the tally images, management becomes easy.

In addition, instead of random tally images, tally images in which favorite gray-scale images are inserted can be created, so that the entertainment characteristic increases. For example, the following "compatibility diagnosis system" can be configured. Following diagnosis system is realized due to threshold matrix grouping function.

(1) A user can acquire any tally image among S1 through S5 by answering a questionnaire. The one of S1 through S5 is transmitted based on the results of the personal questionnaire. For example, S1 is sorted to show an attention seeker, and S2 is sorted to show a gentle personality, and so on. Judgment is made based on the answer to the questionnaire.

(2) Every user has one tally image. When users superpose their tally images, a distance between the users is displayed if your tally image is generated from a seed image by using Patent-Document 2 and 3. It is judged that the closer the distance, the higher their compatibility.

Herein, a face of a person can be inserted in the tally image. For example, faces of a person A and a person B are inserted in the two tally images, respectively, and by superposing these, their compatibility is displayed as "80%." By inserting name characters of the persons into parts of the images (for example, the upper left or the lower right) so as not to overlap each other when superposing the tally images. In this diagnosis system, tally images from same group can not decode the confidential image. Same group's member should be consisted of persons who do not need to diagnose.

It is also possible that many parts such as the eye, nose, and mouth of a user are stored in a server, and parts selected among the stored parts according to the results of a questionnaire are combined to create a gray-scale image, and a tally image is created from this gray-scale image and sent back to the user. When the number of parts is large, since the number of combinations becomes large, it is wasteful that a large amount of gray-scale images or tally images are prepared in advance in the server, however, according to the invention, a large amount of tally images can be created at a high speed by using the parts. The user looks forward to receive a tally image while wondering what image is inserted in the tally image based on the results of a questionnaire, so that the entertainment characteristic increases.

The same effect can also be expected in an image seal system using the (k, n) method. For example, an image seal system can be configured which makes a character image "Approved" to appear when four or more directors among ten directors gather. In this case, even when the directors have many seals, by inserting images of the seals in the tally images, management of the seals becomes easy. By inserting name character image in the tally images so that the tally images can be identified by others, it can be understood by others whose seal a tally shows. Meaningless tally images can also be created by inputting an even gray-scale image in a moderate tone into a threshold matrix. Any even gray-scale tally image in a moderate tone can be used as a seed image, and its extensibility is high.

In addition, the invention can also be used for authentication tools, sale promotion tools, copyright protection, and concealment of confidential information by using high-quality halftone images.

What is claimed is:

1. A tally image generating method in a tally image generator comprising:
   a first step for preparing a set of binary seed images in said tally image generator that tally with each other;
   a second step for creating a set of threshold matrices in said tally image generator from the set of seed images; and
   a third step for creating a plurality of tally images in said tally image generator by using the set of threshold matrices,
   wherein the second step includes processing to create a plurality of different binary pattern images from a plurality of seed images that tally with each other, and processing to create a set of threshold matrices from the binary pattern images, and the processing to create the binary pattern images includes processing to exchange pixels only within a region divided based on a confidential image without destroying the pixel set among the seed images.

2. The tally image generating method according to claim 1, wherein as the processing to exchange the pixels, a plurality of positions are selected only within a region divided based on a confidential image, and the positions of the set of pixels are repeatedly exchanged.

3. The tally image generating method according to claim 2, wherein when a plurality of positions are selected only within a region divided based on the confidential image, values calculated in one seed image among the plurality of seed images are used to select the positions.

4. The tally image generating method according to claim 2, wherein when a plurality of positions are selected only within a region divided based on the confidential image, values calculated in the plurality of seed images are alternately used to select the positions.

5. The tally image generating method according to claim 1, wherein, at the third step, a group of a lot of binary tally images is created from different various gray-scale images by using a threshold matrix created at the second step.

6. The tally image generating method according to claim 5, wherein a tally image is selected from each selected group to decode a confidential image.

7. A decoding method for decoding a confidential image from groups of a lot of tally images created according to claim 5, wherein a tally image is selected from each selected group and selected tally images are combined to decode a confidential image.

8. The tally image generating method according to claim 1, wherein the second step includes processing to create a second threshold matrix from a first threshold matrix.

9. The tally image generating method according to claim 8, wherein for the regions except regions that does not need to change its density even after superposing a plurality of tally images, a binary pattern image is inputted, and density calculation is performed to create threshold values of the second threshold matrix.

10. The tally image generating method according to claim 9, wherein the binary pattern image to be inputted is a binary pattern image generated by inputting a predetermined value to the first threshold matrix.

11. The tally image generating method according to claim 8, wherein for the regions except regions that does not need to change its density even after superposing a plurality of tally images, threshold values set of the first threshold matrix are reassigned to threshold values set of the second threshold matrix.

12. A tally image generator comprising:
    a first means for preparing a set of binary seed images that tally with each other;
    a second means for creating a set of threshold matrices from the set of seed images; and
    a third means for creating a plurality of tally images by using the set of threshold matrices,
    wherein the second means includes a processing means for creating a plurality of different binary pattern images from a plurality of seed images that tally with each other, and a processing means for creating a set of threshold matrices from the binary pattern images, and the processing means for creating the binary pattern images exchanges pixels only within a region divided based on the confidential image without destroying a pixel set among the seed images.

13. The tally image generator according to claim 12, wherein the third means creates a group of a lot of binary tally images from different various gray-scale images by using a threshold matrix created by the second means.

14. The tally image generator according to claim 13, wherein a tally image is selected from each selected group to decode a confidential image.

15. The tally image generator according to claim 13, wherein the second means includes a processing means for creating a second threshold matrix from a first threshold matrix.

16. A tally image generator according to claim 15, wherein for the regions except regions that does not need to change its density even after superposing a plurality of tally images, a binary pattern image is inputted, and density calculation is performed to create threshold values of the second threshold matrix.

17. A decoder for decoding a confidential image from groups of a lot of tally images created according to claim 13, wherein a tally image is selected from each selected group and selected tally images are combined to decode a confidential image.

* * * * *